United States Patent
Li et al.

(10) Patent No.: US 11,829,340 B1
(45) Date of Patent: Nov. 28, 2023

(54) SYSTEMS AND METHODS FOR GENERATING DATA TRANSFERS USING PROGRAMMING LANGUAGE-AGNOSTIC DATA MODELING PLATFORMS

(71) Applicant: Citibank, N.A., New York, NY (US)

(72) Inventors: Chuan Li, New York, NY (US); Jim B. Adams, New York, NY (US); Yan Liu, Rutherford, NJ (US); Peter Huang, New York, NY (US); Alicia Wang, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/339,269

(22) Filed: Jun. 22, 2023

(51) Int. Cl.
*G06F 16/22* (2019.01)
(52) U.S. Cl.
CPC .................................. *G06F 16/22* (2019.01)
(58) Field of Classification Search
CPC ............................. G06F 16/22; G06F 16/245
See application file for complete search history.

(56) References Cited

U.S. PATENT DOCUMENTS

| | | | |
|---|---|---|---|
| 10,754,838 B1* | 8/2020 | Reiner | G06F 16/22 |
| 2009/0012983 A1* | 1/2009 | Senneville | G06F 16/256 |
| 2009/0319544 A1* | 12/2009 | Griffin | G06F 16/25 |
| 2014/0279838 A1* | 9/2014 | Tsirogiannis | G06F 16/235 707/603 |
| 2018/0173795 A1* | 6/2018 | Cobbett | G06F 16/316 |
| 2019/0005117 A1* | 1/2019 | Vasisht | G06F 8/70 |
| 2020/0334277 A1* | 10/2020 | Doyle | G06F 16/211 |
| 2022/0129330 A1* | 4/2022 | Tan | G06F 16/258 |

* cited by examiner

*Primary Examiner* — Merilyn P Nguyen
(74) *Attorney, Agent, or Firm* — Perkins Coie LLP

(57) ABSTRACT

Systems and methods for a programming language-agnostic data modeling platform that is both less resource intensive and scalable. Additionally, the programming language-agnostic data modeling platform allows for advanced analytics to be run on descriptions of the known logical data models, to generate data offerings describing underlying data, and to easily format data for compatibility with artificial intelligence systems. The systems and methods use a supplemental data structure that comprises logical data modeling metadata, in which the logical data modeling metadata describes the logical data model in a common, standardized language. For example, the logical data modeling metadata may comprise a transformer lineage of the logical data model.

19 Claims, 19 Drawing Sheets enum NewContinent

{ NorAmerica, CenAmerica, SouAmerica }

200

205

```
package ldm.com.citi.hr;
class Person {
    String      name;
    Date        birthDate;
    String      ssn;
```

210

215

```
Package  ldm.com.citi.icg.tradeutils;
identifiable class Trader {
    String _ID_;   // required for identifiable
    String         name;
    String         traderid;          220
    float  capital_quota;
    key    [ traderid ]
    } identifiable class Product {
    String _ID_;   // required for identifiable
    String         name;
    String         category;
    String         cusip;
    String         isin;
    key [ category, cusip, isin ]
    }                                           225
```

```
Class PaymentSchedule {
         Date    paymentDate[1..*];
         Float amount[1..*];
    }
240  Identifiable Class Loan {
     String _ID_;
     String loanID;
     String borrower;
     PaymentSchedule paymentSchedule[1..*];
     Key [loanID];
    }
```

```
class Meeting {
    Employee host;
    Employee attendee[2..*] required;
    DateTime start;
    DateTime end;
    Inv: end > start; // OCL Invariant,
meeting starts before it ends
    Inv: host.birthdate < start;  //
OCL Invariant, host must be born to
host meeting
}
```

260

265

```
class Customer {
    String name;

@confidential
    DateTime birthdate;

@confidential
    String ssn;
}
```

270

275

```
@Critical
class PositionPnLDaily {
    Position position;
    Float PnL;
DateTime asof;
```
280

285

```
// define a new Trade class by
composition with other user defined
classes
@{DataConcept=" Trade - L2"}
Identifiable class Trade {
    String              _ID_;    //
required for identifiable
    Trader              trader;
    Product             product;
    Counterparty        counterparty;
    Float               quantity;
    String              tradeid;
    Key                 [ tradeid ]
}
```

290

295

SYSTEMS AND METHODS FOR GENERATING DATA TRANSFERS USING PROGRAMMING LANGUAGE-AGNOSTIC DATA MODELING PLATFORMS

BACKGROUND

Large entities often store data in a fragmentary fashion because the large entity typically includes many smaller entities that each have individual ways of accumulating, storing, formatting, and/or handling data. As a result, the large entity often stores the same content in different locations, with different formats, and/or using different schemas. Not only does this result is storage inefficiencies, but it also leads to decoherence and/or conflicts between the content. For example, as the content often features data fields or attributes that have different names, formats, etc., it is often difficult to discern what data has similar content, much less determine whether that data is correct.

In view of this, many entities rely on data modeling to increase the efficiency of storage and use of their data. Data modeling is the practice of determining how data currently exists, identifying the entities within a universe of data, and determining where each entity (and its respective data) fits in relation to the others. However, similar to the storage of the data itself, data modeling is also done in a fragmentary fashion. As such, the data modeling must also often be accompanied by metadata that describes how the data model (and the data in the data model) should be used. While the metadata also has the issues related to the fragmentary production, the metadata also includes additional issues that may prevent users from determining when the data was captured, whether the data was validated, whether the data was complete, etc. Moreover, as metadata is typically transmitted separately, using an ad hoc process in which the metadata is converted to a latent representation and transmitted in bulk to a destination system, the richness of metadata, as represented at the source, is irrevocably lost to the destination system.

SUMMARY

Systems and methods are described herein for novel uses and/or improvements to data modeling. As one example, systems and methods are described herein for a data modeling platform that allows for novel uses of known logical data models for a given entity. For example, data models may describe how data currently exists, categories within the data, and relationships between the different categories of data. Different types of data models may describe the data and relationships differently. For example, conceptual data models typically describe relationships between application function features and how the features relate to each other when the application is functioning. While conceptual data models provide a hierarchical view of features and their relationships, conceptual data models typically do not provide information related to specific attributes of the features. Logical data models describe how data (e.g., for a given feature) moves between its source (e.g., a user, database, and/or other data source) and its destination (e.g., another user, database, and/or feature). For example, the logical data model may describe features, attributes, relationships, cardinality, and/or constraints for a data model in a data modeling language. Finally, physical data models define the structure of a database or feature schema used to store, process, and/or otherwise use data. The flow of data from a logical data model to a physical data model may be conducted via an application programming interface (API) that may comprise a specific programming language.

In conventional systems, due to the fragmentary fashion of the data modeling, each logical data model requires a unique mapping to each physical data model that requires its own, unique conversion table or other construct (i.e., a "unique mapping approach"). This unique mapping describes how a given attribute (or field) in the logical data model is unambiguously mapped to a given column (or other schema component) in a given physical data model. Using this mapping, data may be downloaded from a data source for the logical data model to a repository (e.g., a local database) specific to the physical data model. To create this mapping, conventional systems must first generate the conversion table for a data source of the given logical data model. The system then maps the schema components of the physical data model to the columns in the conversion table and maps the data source for the logical data model to the conversion table. However, the creation of a conversion table that is unique to a specific pair of a given logical data model and a given physical data model is resource intensive, as each conversion table needs to be manually created. It is also not scalable, as each conversion table is only compatible with the specific pair of the given logical data model and the given physical data model. That is, following a data transfer, the conversion table is not reusable.

One solution for limiting the resource-intensive nature of uniquely generating a conversion table and/or increasing scalability is to create proprietary data models that comprise elements of a functional programming language (e.g., in order to program constraints and transformations for data model mappings) built directly into the proprietary data models (i.e., a "proprietary approach"). However, this approach also has several drawbacks, namely that the data modeling and data mapping is now confined to the specific proprietary modeling language. That is, the proprietary data model is not compatible with any non-proprietary data models, and any interactions with the proprietary data model must be through the specific proprietary modeling language.

In contrast, the systems and methods describe a programming language-agnostic data modeling platform that is both less resource intensive and scalable. Additionally, the programming language-agnostic data modeling platform allows for advanced analytics to be run on descriptions of the known logical data models, generate data offerings describing underlying data, and easily format data for compatibility with artificial intelligence systems. In order to ensure that the data modeling platform is programming language-agnostic, the data modeling platform is built upon a standardized modeling language. However, the standardized modeling language does not include the built-in program constraints and transformations for data model mappings characteristic of the proprietary solution discussed above. To overcome this technical deficiency, the systems and methods use a supplemental data structure that comprises logical data modeling metadata, in which the logical data modeling metadata is mapped from the standardized modeling language of the logical data model to common, standardized programming languages that are compatible with a plurality of APIs.

The logical data modeling metadata may comprise a transformer lineage of the logical data model. That is, the metadata may describe a transformer lineage in the supplemental data structure that may include conversions, formatting, and/or a lineage of changes thereto that are performed on data received, processed, and/or outputted by the logical data model according to the standardized modeling language, but in a format that is compatible with standardized programming languages.

Through the use of the supplemental data structure, data models do not require elements of a functional programming language to be built directly into each data model (i.e., making the data models programming language-agnostic), and the data models do not need to be limited to proprietary solutions. Instead, one or more operations (e.g., data analytic operations, data transfers, and/or generation of metadata-rich data transfer packages for data offerings) may be based on the logical data modeling metadata as interpreted by the supplemental data structure. For example, the logical data modeling metadata may comprise a script set that includes one or more commands within a file capable of being executed without being compiled.

As the supplemental data structure describes the modeling language of the logical data modeling in a language compatible with standardized programming language operations, queries, commands, and/or other processing statements for these operations may be issued to, or applied on, the supplemental data structure (or logical data modeling metadata) in the standardized programming language. The results of these queries, commands, and/or other processing statements may then be executed against the logical data model via the supplemental data structure. Moreover, the supplemental data structure, and the logical data modeling metadata recorded therein, may act as "living code" that may be updated as new mappings, lineages, and/or artifacts are implemented to introduce new features, expand compatibility, and/or scale across diverse network ecosystems. As these updates occur to the supplemental data structure, and not to the logical data model and/or the underlying data, such updates do not limit the accessibility of the data and/or inhibit other downstream functions.

In some aspects, systems and methods are described for providing metadata-rich data transfers based on logical data models. For example, the system may receive a first request to populate a first local data repository with a first dataset from a first data source, wherein the first data source uses a first logical data model, and wherein the first local data repository has a first physical data model. The system may, in response to the first request, retrieve a first supplemental data structure for the first logical data model, wherein the first supplemental data structure is expressed in a standardized language and comprises a first attribute, and wherein the first attribute comprises a first transformer lineage of the first logical data model. The system may determine a first mapping of the first logical data model to the first physical data model by mapping the first attribute to the first physical data model. The system may populate the first local data repository with the first dataset based on the first mapping.

In some aspects, systems and methods are described for providing metadata-rich data transfers based on logical data models. The system may receive a first request for a metadata-rich data transfer package for a first dataset from a first data source, wherein the first dataset is used to populate a first local data repository, wherein the first data source uses a first logical data model, and wherein the first local data repository has a first physical data model. The system may, in response to the first request, determine a first supplemental data structure for the first logical data model, wherein the first supplemental data structure is expressed in a standardized language and comprises a first attribute, and wherein the first attribute comprises a first transformer lineage of the first logical data model. The system may determine a first dataset characteristic for the first dataset based on the first transformer lineage. The system may generate a first description for the metadata-rich data transfer package based on the first dataset characteristic.

In some aspects, systems and methods are described for providing database analytics on logical data models using supplemental data structures. For example, the system may receive a first request for a first data analytic operation to be performed using a plurality of logical data models, wherein each respective logical data model of the plurality of logical data models corresponds to a respective supplemental data structure that provides one or more transformer lineages of each respective logical data model in a standardized language. The system may perform the first data analytic operation by: determining a first data analytic operation characteristic corresponding to the first data analytic operation; retrieving a first supplemental data structure for a first logical data model of the plurality of logical data models; comparing the first data analytic operation characteristic to a first transformer lineage of the first supplemental data structure; and generating for display, on a user interface, a recommendation in response to the first request based on comparing the first data analytic operation characteristic to the first transformer lineage of the first supplemental data structure.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, the systems and methods recite a programming language-agnostic data modeling platform that provides improvements over unique mapping and proprietary approaches. For example, as described above, the unique mapping approach is not scalable. With respect to the proprietary approach, while the proprietary modeling language of the data model may be used to automatically integrate logical data layers and physical data layers, any variation in this automation requires users to learn the automatic mapping of the proprietary modeling language as well as requires the proprietary modeling language to support a requesting APIs.

In contrast to these approaches, the systems and methods use an industry-common modeling language (e.g., Unified Modeling Language (UML)). However, this industry-common modeling language does not include its own automatic mapping and/or any built-in program constraints or transformations for creating data model mappings. To account for this deficiency, and ensure that the resulting platform has open API support, the systems and methods use a supplemental data structure that comprises logical data modeling metadata, in which the logical data modeling metadata maps the standardized modeling language of the logical data model in to common, standardized programming languages that are compatible with a plurality of APIs.

Figure 1A:
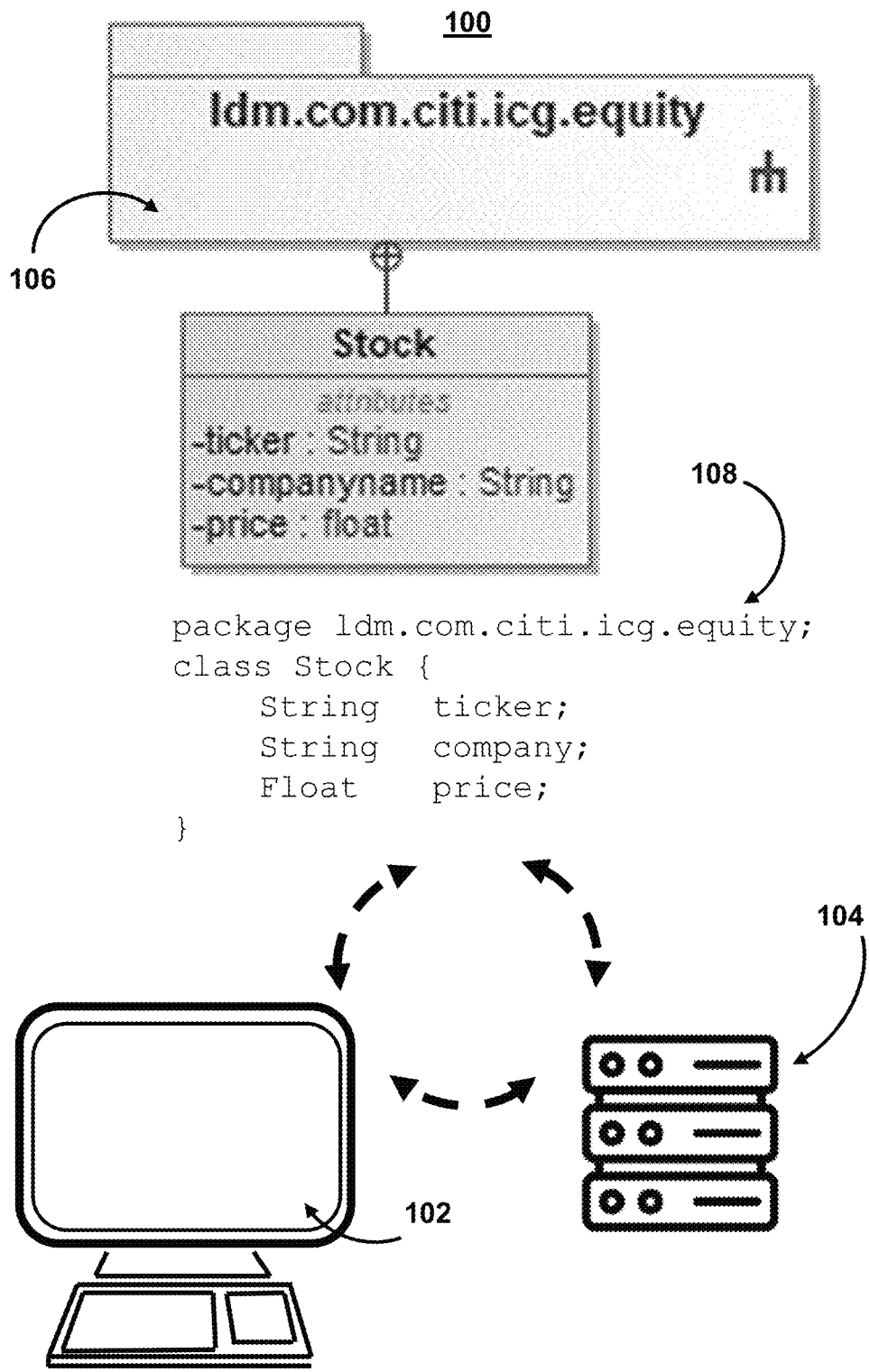
FIGS. 1A-1D show an illustrative diagram for a data modeling platform in accordance with one or more embodiments.

FIGS. 1A-1D show an illustrative diagram for a data modeling platform in accordance with one or more embodiments. For example, FIG. 1A shows a data modeling platform (e.g., system 100) that includes a user interface (e.g., user interface 102) and a computer-readable medium (e.g., server 104) used to provide and/or access a data modeling platform. System 100 may comprise a computing platform related to, or used for, data modeling. As described herein, a computing platform or digital platform is an environment in which a piece of software is executed. In some embodiments, the platform may comprise a hardware or the operating system (OS), even a web browser and associated APIs, and/or other underlying software. In some embodiments, the platform may have different abstraction levels, including a computer architecture, an OS, or runtime libraries. For example, the platform may be the stage on which computer programs can run.

In some embodiments, system 100 (and/or a platform corresponding thereto) may perform data modeling. In some embodiments, data modeling may be the process of creating a visual representation of either a whole information system or parts of it to communicate connections between data points and structures. For example, the goal of a data model may be to determine the types of data used and stored within the system, the relationships among these data types, the ways the data can be grouped and organized, and the data's formats and attributes. In some embodiments, data models are built around technical and/or non-technical (e.g., business) needs.

In some embodiments, system 100 (and/or a platform corresponding thereto) may be built using a data modeling language. For example, the logical data model may describe features, attributes, relationships, cardinality, and/or constraints for the data model in a data modeling language (e.g., SQL, dbt, LookML, and ThoughtSpot Modeling Language (TML)). The flow of data from system 100 (and/or a platform corresponding thereto) to a physical data model may be conducted via one or more APIs that may comprise a specific programming language (e.g., JavaScript, Ruby, Python, or Java).

Figure 1B:
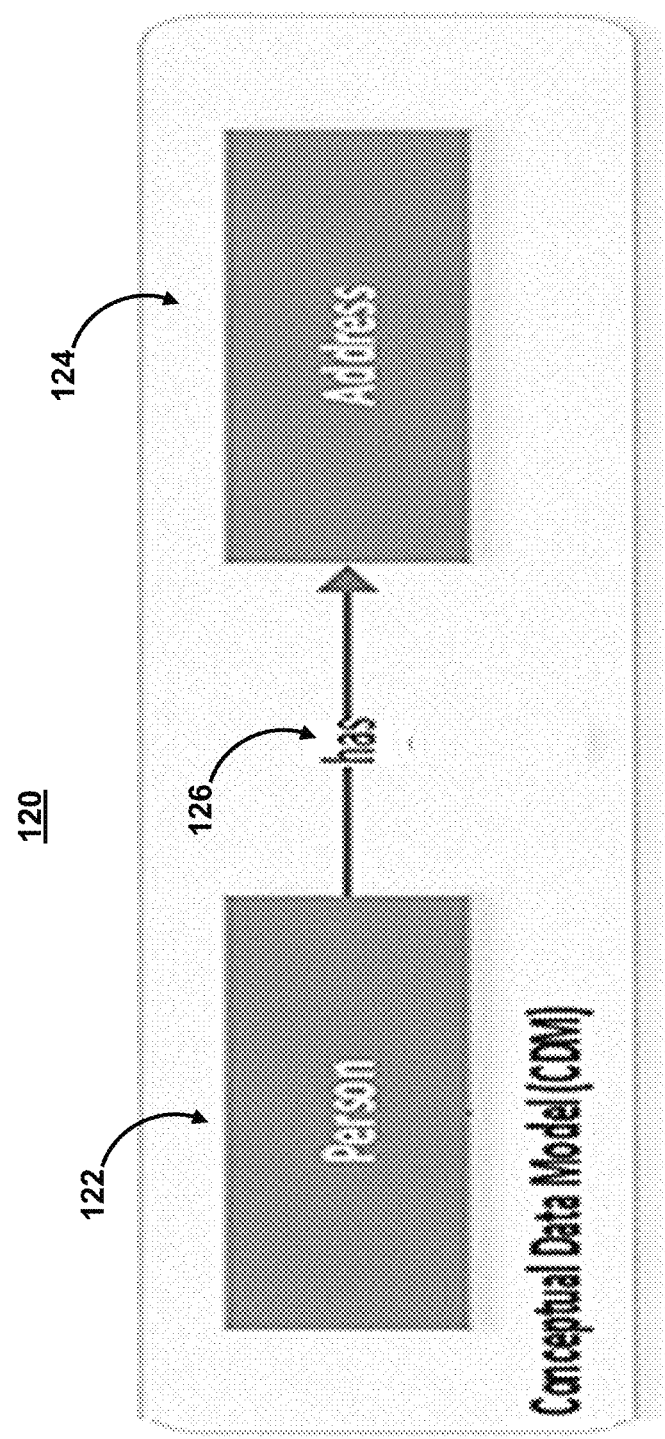
Figure 1C:
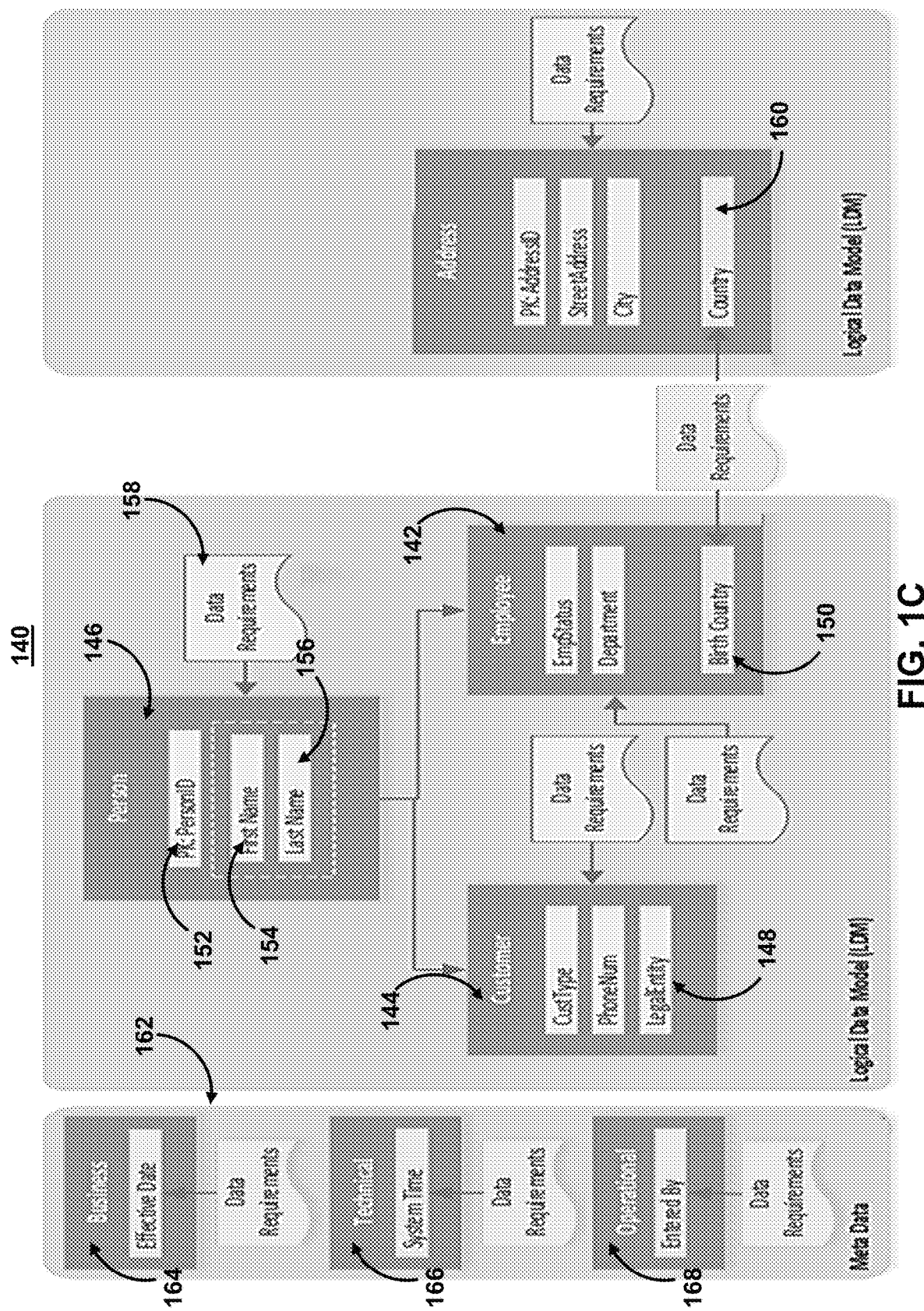
Figure 1D:
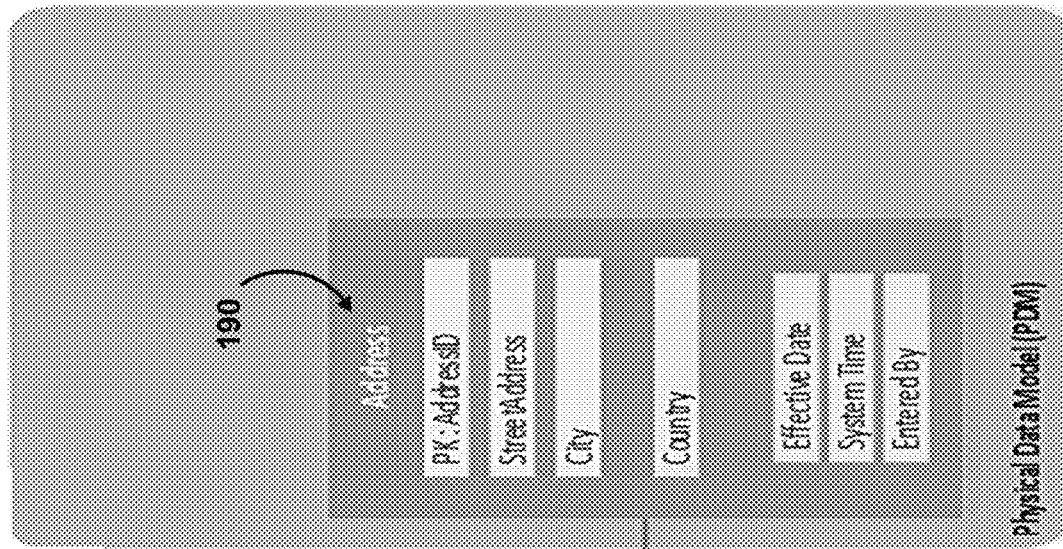
Figure 1D:
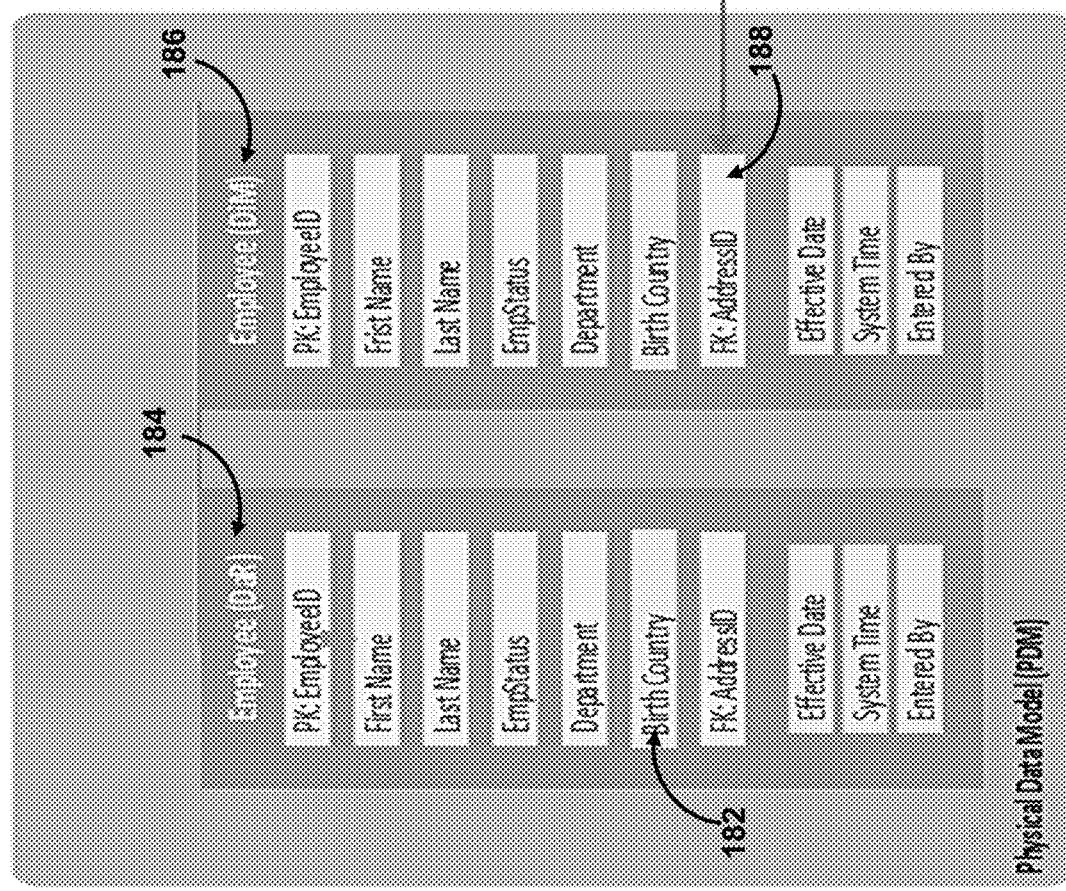

In some embodiments, data may be modeled at various levels of abstraction and/or in terms of the different types of data (e.g., as shown in FIGS. 1B-1D). For example, conceptual data models (e.g., conceptual data model 120 (FIG. 1B)) typically describe relationships between application function features and how the features relate to each other when the application is functioning. While conceptual data models provide a hierarchical view of features and their relationships, conceptual data models typically do not provide information related to specific attributes of the features. Conceptual data models may describe broad classes of data (e.g., "transaction data for users").

Logical data models (e.g., logical data model 140 (FIG. 1C)) describe how data (e.g., for a given feature) moves between its source (e.g., a user, database, and/or other data source) and its destination (e.g., another user, database, and/or feature). For example, the logical data model may describe features, attributes, relationships, cardinality, and/or constraints for each feature. Logical data models may describe attributes (e.g., "social security number," "name," "address," etc.) for a class of the conceptual data models.

Finally, physical data models (e.g., physical data model 180 (FIG. 1D)) define the structure of a database or feature schema used to store, process, and/or otherwise use data. System 100 and/or the data models related thereto may comprise living documents that evolve along with changing technical and/or non-technical needs. Physical data models may describe how specific attributes of a logical data model are stored in a given physical data model.

System 100 may collect information about technical and/or non-technical requirements from stakeholders and/or end users. These technical and/or non-technical requirements may then be codified, by system 100, into data structures to formulate a platform, database, and/or conceptual design of the data model. For example, system 100 may employ standardized schemas and formal techniques. This provides a common, consistent, and predictable way of defining and managing data resources across the platform. Furthermore, different types of data models may describe the data and relationships differently. As such, rules and/or requirements for each platform, and/or type of data model therein, may be defined up front through feedback from one or more technical and/or non-technical stakeholders so that the rules and/or requirements may be incorporated into the design of a new system or adapted in the iteration of an existing one.

In some embodiments, system 100 may also utilize a supplemental data structure that comprises standardized programming languages, schemas, and formal techniques in order to provide a common, consistent, and/or predictable way of defining and managing data resources across system 100. Furthermore, the supplemental data structure may allow for the benefits of a standardized platform to be achieved without requiring the platform itself to be standardized to a particular API. For example, many entities rely on data modeling to increase the efficiency of storage and use of their data. However, modeling is also done in a fragmentary fashion. As such, the data modeling must also often be accompanied by metadata that describes how the data model (and the data in the data model) should be used. While the metadata also has the issues related to the fragmentary production, the metadata also includes additional issues that may prevent users from determining when the data was captured, whether the data was validated, whether the data was complete, etc. Moreover, as metadata is typically transmitted separately, using an ad hoc process in which the metadata is converted to a latent representation and transmitted in bulk to a destination system, the richness of metadata, as represented at the source, is irrevocably lost to the destination system.

One solution (i.e., the unique mapping approach) to resolving these issues is to enforce a strict standardization requirement on data models and/or the platform. However, such an approach limits the usability of the platform as many data resources may use different (i.e., non-standardized) components. Due to the fragmentary fashion of conventional data modeling, each logical data model requires a unique mapping to each physical data model that requires its own, unique conversion table (or other construct). This unique mapping describes how a given attribute (or field) in the logical data model is unambiguously mapped to a given column (or other schema component) in a given physical data model. Using this mapping, data may be downloaded from a data source for the logical data model to a repository (e.g., a local database) specific to the physical data model. To create this mapping, conventional systems must first generate the conversion table for a data source of the given logical data model. The system then maps the schema components of the physical data model to the columns in the conversion table and maps the data source for the logical data model to the conversion table. However, the creation of a conversion table that is unique to a specific pair of a given logical data model and a given physical data model is resource intensive, as each conversion table needs to be manually created. It is also not scalable, as each conversion table is only compatible with the specific pair of the given logical data model and the given physical data model. That is, following a data transfer, the conversion table is not reusable.

System 100 may allow for advanced analytics to be run on descriptions of the known logical data models, generate data offerings describing underlying data, and easily format data for compatibility with artificial intelligence systems and/or efficiency data transfers. To provide this functionality, system 100 may use a supplemental data structure (e.g., supplemental data structure 106) that comprises logical data modeling metadata, in which the logical data modeling metadata describes the logical data model in a common, standardized modeling language. For example, the logical data modeling metadata may comprise a transformer lineage of the logical data model. That is, the metadata may describe a transformer lineage included in the supplemental data structure that may include conversions, formatting, and/or a lineage of changes thereto that are performed on data received, processed, and/or outputted by the logical data model according to the standardized modeling language, but in a format that is compatible with standardized programming languages.

For example, through the use of the supplemental data structure (e.g., supplemental data structure 106), system 100 may use data models that do not require elements of a functional programming language to be built directly into each data model (i.e., making the data models programming language-agnostic), and the data models do not need to be proprietary. Instead, one or more operations (e.g., data analytic operations, data transfers, and/or generation of metadata-rich data transfer packages for data offerings) of system 100 may use the logical data modeling metadata as interpreted by the supplemental data structure.

As the supplemental data structure (e.g., supplemental data structure 106) describes the logical data modeling in a standardized language, queries, commands, and/or other processing statements for these operations may be issued to, or applied on, the supplemental data structure in the standardized language. The results of these queries, commands, and/or other processing statements may then be executed against the logical data model via the supplemental data structure. Moreover, the supplemental data structure, and the logical data modeling metadata recorded therein, may act as "living code" that may be updated as new mappings, lineages, and/or artifacts are implemented to introduce new features, expand compatibility, and/or scale across diverse network ecosystems. As these updates occur to the supplemental data structure, and not to the logical data model and/or the underlying data, such updates do not limit the accessibility of the data and/or inhibit other downstream functions.

The supplemental data structure (e.g., supplemental data structure 106) may comprise one or more data structure characteristics. The data structure characteristic may comprise a characteristic that distinguishes one data structure from another. In some embodiments, the data structure characteristic may comprise logical data modeling metadata. The logical data modeling metadata may comprise mappings (e.g., mapping a logical data model to a physical data model), lineages (e.g., a transformer lineage of the first supplemental data structure), and/or artifacts (e.g., artifacts used to execute processing statements).

In some embodiments, the data structure characteristic (and/or logical data modeling metadata) may comprise entities (e.g., businesses, business segments, computer networks, systems, users, functions, and/or technical and/or non-technical needs) related to the data platform and one or more of the plurality of logical data models hosted, accessible to, and/or managed by system 100. For example, data structure characteristics may comprise an identification of the things, events, and/or concepts that are represented in a dataset (and/or data model) that is to be modeled. System 100 may identify each entity in a manner such that the identification is cohesive and/or each entity is logically discrete from all other entities.

In another example, data structure characteristics may comprise one or more attributes of each entity. For example, system 100 may identify an attribute of an entity and/or entity type that may be differentiated from other entities and/or entity types. As an example, an entity called "account holder" may possess such attributes as a first name, last name, telephone number, and salutation, while an entity called "address" might include a street name and number, city, state, country, and zip code. In another example, data structure characteristics may comprise relationships among entities (e.g., each account may correspond to an address, and a data structure characteristic may designate this relationship). In another example, data structure characteristics may comprise data that maps attributes to entities (e.g., object-oriented data that maps patterns to attributes, maps domains to patterns, etc.). In another example, data structure characteristics may comprise data related to normalization, redundancies, performance requirements, etc. For example, normalization may require organizing one or more data models (and/or the databases, datasets, etc. represented) in which numerical identifiers, called keys, are assigned to groups of data to represent relationships between them without repeating the data. For instance, if accounts are each assigned a key, that key may be linked to both their address and their order history without having to repeat this information in the table of account names. By doing so, system 100 may reduce the amount of storage space a database will require.

In another example, data structure characteristics may comprise a model type of the data model. For example, system 100 may use a hierarchical data model to represent one-to-many relationships in a treelike format. Additionally or alternatively, system 100 may use a relational data model in which data segments are explicitly joined through the use of tables, reducing database complexity. Relational databases frequently employ structured query language (SQL) for data management. These databases work well for maintaining data integrity and minimizing redundancy. Additionally or alternatively, system 100 may use an entity-relationship (ER) data model where a formal diagram (or graph structure) is used to represent the relationships between entities in a database. Additionally or alternatively, system 100 may use an object-oriented data model where objects are grouped in class hierarchies and have associated features. Object-oriented databases can incorporate tables, but system 100 may also support more complex data relationships. Additionally or alternatively, system 100 may use a dimensional data model to optimize data retrieval speeds for analytic purposes in a data warehouse. For example, while relational and ER models emphasize efficient storage, dimensional models increase redundancy in order to make it easier to locate information for reporting and retrieval. In particular, dimensional data models may use a star schema, in which data is organized into facts (measurable items) and dimensions (reference information), where each fact is surrounded by its associated dimensions in a starlike pattern. Dimensional data models may also use a snowflake schema, which resembles the star schema but includes additional layers of associated dimensions, making the branching pattern more complex.

In another example, data structure characteristics may comprise a data source for data is a dataset, a type of the data, a qualitative and/or quantitative description of the data, and/or other information about the data. For example, system 100 may use one or more components (e.g., server 104). These components may comprise software, hardware, and/or other computer-readable medium. For example, system 100 may transfer a dataset from a source to populate a local data repository. In some embodiments, the source and repository may both comprise a component (e.g., a server) and/or may relate to different entities. Each of these components may comprise a physical data model. For example, physical data models define the structure of a database or feature schema used to store, process, and/or otherwise use data.

In some embodiments, system 100 may receive data from one or more data sources. As described herein, a data source may comprise a location from which data (e.g., a dataset) that is being used originates. A data source may be the initial location where data is born or where physical information is first digitized. Data received from a data source may be transmitted to a data repository. As referred to herein, a data repository or data warehouse may comprise a data store that aggregates data, usually from multiple sources and/or entities, with or without the data being necessarily related. In some embodiments, the data repository may comprise a data lake. A data lake is a large data repository that stores unstructured data that is classified and tagged with metadata.

System 100 may bundle and/or otherwise transmit data from a dataset with one or more data structure characteristics. As described herein, the bundle of data and the supplemental data characteristics may comprise a metadata-rich data transfer package. Furthermore, system 100 may generate a description of the metadata-rich data transfer package based on one or more of the supplemental data characteristics included in the metadata-rich data transfer package. For example, the system may use a supplemental data structure (and/or one or more data structure characteristics) to generate a data offering that includes a description of the underlying data. In some embodiments, system 100 may allow for subscriptions to data sources in which data is automatically bundled in metadata-rich data transfer package based on a supplemental data structure.

As described herein, a data offering may comprise a communication of data and/or data characteristics. For example, a data offering may include the supplemental data structure as it describes the logical data flow (e.g., where the conceptual data is coming from, how it is being processed, etc.) of the data that is available at the conceptual data model (or a layer corresponding to the conceptual model). This logical data flow may include all (or at least, in one embodiment) hundred attributes, tags, fields, etc. for the data that is described at the conceptual data model. In some embodiments, the logical data flow may comprise thousand (or millions of attributes) corresponding to different data characteristics and/or included in a data offering. By including these data attributes in the logical data flow, the system ensures that recipients to understand what data (e.g., specific attributes, tags, fields, etc.) is included in a transfer.

In some embodiments, a data offering may correspond to a recommendation and/or a transfer of a dataset (or a portion thereof) from a source to populate a local data repository. For example, the system may generate a data transfer package, which may refer to any organized communication of data for a source to a destination. The system may ensure that these data transfer packages are metadata-rich by including data characteristics as described herein.

System 100 may access supplemental data structure 106. Supplemental data structure 106 may comprise a class that belongs to a containing package. The containing package may create domains for different models. Models with different package names may be considered different classes. Supplemental data structure 106 may be define in a standardized modeling language. The standardized modeling language may be a script set. A script may be a program or sequence of instructions that is interpreted or carried out by another program rather than by the computer processor (as a compiled program is). In some embodiments, a script or scripting language may be a computer language with several commands within a file capable of being executed without being compiled. For example, supplemental data structure 106 is shown in FIG. 1A as being expressed in standardized language script set 108.

Standardized language script set 108 may be generated from taxonomy/controlled vocabulary. For example, the full name of Stock class is: "ldm.com.citi.icg.equity" which is unique to the data model. System 100 may generate a package name composed from the taxonomy/controlled vocabulary that has a relational meaning to an entity, function, etc. In some embodiments, standardized language script set 108 may be compiled using UML. In particular, in relation to standardized language script set 108 and the standardized language script used to generate standardized language script set 108, the system may ensure that one or more requirements for the standardized language script are met.

For example, standardized language script may maintain one or more types of conformance such as abstract syntax conformance, concrete syntax conformance, model interchange conformance, diagram interchange conformance, and/or semantic conformance. Abstract syntax conformance provides a user interface and/or API that enables instances of concrete UML metaclasses to be created, read, updated, and deleted. The data modeling platform (e.g., system 100) may also provide a way to validate the well-formedness of models that corresponds to the constraints defined in the UML metamodel. Concrete syntax conformance provides a user interface and/or API that enables instances of UML notation to be created, read, updated, and deleted. The data modeling platform (e.g., system 100) may provide the ability to create, read, update, and delete additional diagrams and notational elements that are not defined in UML. Diagram interchange conformance may import and export conformant diagram interchange for all valid UML models with diagrams, including models with profiles defined and/or applied. The data modeling platform (e.g., system 100) may provide diagram interchange conformance by providing both concrete syntax conformance and model interchange conformance. Semantic conformance provides a demonstrable way to interpret UML semantics (e.g., code generation, model execution, and/or semantic model analysis).

In some embodiments, the standardized language script may provide options for a conforming tool that are explicitly stated in a specification (e.g., for use by system 100). Additionally or alternatively, certain aspects of the semantics may be listed as "undefined," "intentionally not specified," or "not specified," allowing for domain- or application-specific customizations that do not contradict the provisions of the specification (e.g., as determined by system 100).

Through the use of the supplemental data structure, system 100 and the data models therein do not require elements of a functional programming language to be built directly into each data model (i.e., making the data models programming language-agnostic). Instead, one or more operations (e.g., data analytic operations, data transfers, and/or generation of metadata-rich data transfer packages for data offerings) may be based on the logical data modeling metadata.

As described herein, "data analytic operations" may comprise any operations related to examining datasets in order to find trends and draw conclusions about the information they contain and/or information related to the use of data models. For example, data analytic operations may include conducting transactions, querying a dataset, generating additional data, transmitting communications related to data transfers, performing encryption/decryption, exchanging public/private keys, and/or other operations related to data modeling. For example, a user may perform a data analytic operation on a supplemental data structure using a user interface (e.g., user interface 102).

A data analytic operation may comprise a data analytic operation characteristic. As referred to herein, a "data analytic operation characteristic" may comprise a characteristic that distinguishes one data analytic operation from another. In some embodiments, the data analytic operation characteristic may comprise a type of the data analytic operation (e.g., a function performed by the data analytic operation, data retrieved by the data analytic operation, and/or other category of the data analytic operation). In some embodiments, the data analytic operation characteristic may comprise a characteristic related to conducting transactions, querying a dataset, generating additional data, transmitting communications related to data transfers, performing encryption/decryption, exchanging public/private keys, and/or other operations related to data modeling.

As referred to herein, a "user interface" may comprise a human-computer interaction and communication in a device, and may include display screens, keyboards, a mouse, and the appearance of a desktop. For example, a user interface may comprise a way a user interacts with an application or a website. Using user interface 102, a user may interact with a data modeling platform hosted on server 104, access content (e.g., content related to the data modeling platform), and/or receive recommendations. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

In some embodiments, the content may include one or more recommendations generated by the data modeling platform. For example, in response to a request submitted to the data modeling platform, the system (e.g., system 100) may respond with one or more recommendations. The recommendations may include any content. In some embodiments, the recommendation may be customized based on the request, a user that submitted a request, and/or a system related to the request. For example, a recommendation may comprise an automatic mapping (e.g., based on a supplemental data structure) from a logical data model to a physical data model. In some embodiments, the recommendation may facilitate a data transfer from a data source to a local data repository.

The system may monitor content generated by, or activities related to, the request, a user that submitted a request, and/or a system related to the request to generate profile data. As referred to herein, "a profile" and/or "profile data" may comprise data actively and/or passively collected about the request, a user that submitted a request, and/or a system related to the request. For example, the profile data may comprise content generated by the request, user, system, etc. and a characteristic for the request, user, system, etc. Profile data may also include a characteristic. As referred to herein, "a characteristic" may include information about the request, user, system, etc.

In some embodiments, the content, profile, and/or recommendations may relate to a data modeling platform (e.g., a data modeling platform provided by system 100). For example, system 100 may provide a data modeling platform that allows for novel uses of known logical data models for a given entity. For example, data models may describe how data currently exists, categories within the data, and relationships between the different categories of data. In some embodiments, the data modeling platform may access and/or incorporate a plurality of different types of data models. For example, the system may access and/or incorporate conceptual data models that describe relationships between application function features and how the features relate to each other when the application is functioning. Additionally or alternatively, the system may access and/or incorporate logical data models that describe how data (e.g., for a given feature) moves between its source (e.g., a user, database, and/or other data source) and its destination (e.g., another user, database, and/or feature). Additionally or alternatively, the system may access and/or incorporate physical data models that define the structure of a database or feature schema used to store, process, and/or otherwise use data.

In some embodiments, the system may leverage other platform services, such as public cloud, inventory, network, storage, and/or other services, to facilitate improvement of data management, governance, and utilization. This may include, but is not limited to, data cataloging, data lineage, tracing, transformation, and/or integration. For example, data governance may comprise changes in models and metadata that are dependent on decisions made by data owners, stewards, and custodians in the data governance process. Metadata management (e.g., via metadata management domain 162 (FIG. 1C)) may integrate with the systems supporting the data governance process in order to inform and/or drive acceptance or rejection of changes.

FIGS. 1B-1D show an illustrative diagram for different types of data models in accordance with one or more embodiments. The data models, metadata related to the models, and/or data characteristics of data to which the data models are applied may be stored in a supplemental data structure. The supplemental data structure may comprise (as described above) a file written in a standardized language script. For example, the standardized language script may be a unified metamodel specification, which may be a common language that is used to describe all metadata across the data modeling platform (and/or the enterprise using the data modeling platform). The standardized language script may leverage international standard specifications to enforce interoperability, enable programmatic enforcement of governed data definitions, and be in a machine-readable format. This standardized modeling language approach facilitates the representation and exchange of models and related metadata: the structure of the metadata registry, the description of a data element's contextual location in an overarching data model, and/or the relationships between domains, entities, and attributes. For example, technical components which participate in the end-to-end production, processing, and consumption of data may conform to the metadata standards.

By doing so, the system enforces consistency in the product of modeling activities across the enterprise and facilitates their central storage in an enterprise-wide registry. The system also ensures that all data assets (in place and in motion) are described with the same methodology and standard to enable consistent metadata storage and exchange. The system also enables programmatic interaction with metadata by all data capabilities, fundamental in achieving reliable and trustworthy data through implementation and/or operation of standardized technical components supporting the end-to-end data lifecycle.

FIG. 1B shows conceptual data model 120, which may be used by a data modeling platform (e.g., system 100 (FIG. 1A)). A conceptual data model may indicate entities to be represented and determine relationships that exist between them. For example, conceptual data model 120 may comprise the scope of the database to be created and define the general rules that need to be considered. In some embodiments, conceptual data model 120 may represent firmwide data concepts governed by a data governance process. As shown in FIG. 1B, conceptual data model 120 includes two concepts: Person (e.g., concept 122) and Address (e.g., concept 124). Conceptual data model 120 also indicates a relationship (e.g., relationship 126) between these two concepts. For example, conceptual data model 120 may include key business concepts, entities, their relationships, and critical business rules and/or requirements. Conceptual data model 120 may be used (e.g., by system 100 (FIG. 1A)) described using business semantics (e.g., non-technical terminology). For example, conceptual data models (e.g., conceptual data model 120) do not contain specific attributes.

For example, conceptual data models (e.g., conceptual data model 120) capture the high-level data requirements, ensuring that the relationships between concepts are understood and represented. As shown in FIG. 1B, a Person has an Address (e.g., this simplified example does not show the business rules, such as cardinality and optionality of the relationship that would be captured, such as "a person must have one and only one address").

FIG. 1C shows logical data model 140, which may be used by a data modeling platform (e.g., system 100 (FIG. 1A)). Logical data models consist of entities, their attributes, and/or the relationships between these entities. For example, the logical data model may define the structure, but does not indicate itself with the technical aspects of how the database will is constructed. An entity may be anything that needs to be stored as a data object because it is relevant to a technical or non-technical need of the system. Attributes are the characteristics that describe each entity.

Logical data models (e.g., logical data model 140) may extend conceptual data models by detailing the data requirements through the addition of attributes. Logical data models (e.g., logical data model 140) establish precise, system-independent specifications for data (e.g., entity relationships and the business rules defining those relationships, attribute specifications, and/or logical cardinality). Logical data models (e.g., logical data model 140) may include a rule to enforce data inheritance. For example, generalized business attributes and data requirements are abstracted into a parent entity enforcing consistency. Attributes and data requirements that are specific to a child entity are then separated and described. In this example, an Employee (e.g., subclass 142) and a Customer (e.g., subclass 144) are child entities of the parent Person entity (e.g., entity 146). Each has its own customized attributes (e.g., attribute 150 and attribute 148, respectively) in addition to the attributes from the Person entity (e.g., attribute 152). By providing the decomposition of the logical data models, the system may enforce effective governance because while different subject matter experts may be assigned to specific child entities, governance at the parent level ensures "normalization" of common attributes and data requirements.

In some embodiments, logical data model 140 may represent a hierarchical set of relationships, entities, classes, and/or subclasses. As shown in FIG. 1C, logical data model 140 includes two subclasses: Employee (e.g., subclass 142) and Customer (e.g., subclass 144) are subclasses of the Person entity (e.g., entity 146). Each subclass has its own customized attributes (e.g., attribute 150 and attribute 148, respectively) in addition to the attributes from the parent entity (e.g., attribute 152).

Logical data models (e.g., logical data model 140) may comprise one or more data requirements. Data requirements may comprise the data quality rules that are specified and associated with the logical data attributes. In this example, the Person logical data model (e.g., logical data model 140) is derived from the Person conceptual data model. It introduces three attributes: Person ID, First Name, and Last Name. These attributes may be simple or complex types and have associated data requirements. For example, the Person entity (e.g., entity 146) may be derived from the Person concept (e.g., concept 122 (FIG. 1B)) of conceptual data model 120 (FIG. 1B) that has three attributes (e.g., attribute 152, attribute 154, and/or attribute 156). Logical data models may extend conceptual data models by detailing the data requirements through the addition of attributes. Logical data models (e.g., logical data model 140) establish precise, system-independent specifications for data such as entity relationships (e.g., parent/child relationships and/or relationship 126 (FIG. 1B)) and the business rules defining those relationships, attribute specifications, and/or logical cardinality.

Data attributes may also have data requirements (e.g., data requirement 158). The data requirements may be simple or complex data types. Furthermore, data requirements are specified at the attribute level (e.g., simple) or for a group of attributes (e.g., complex). For example, a Person entity (e.g., entity 146) may have a mandatory primary key (e.g., single attribute requirement) corresponding to an account identifier. If a person (e.g., corresponding to entity 146) has a name, both first name and last name need to be provided (e.g., a multi-attribute requirement).

In some embodiments, data requirements may be specified across multiple logical entities. For example, logical data models (e.g., logical data model 140) may also have common attribute requirements. In such cases, logical data models may share common attributes where the data requirements should be applied consistently regardless of which model the attribute appears in. This abstraction of common data requirements that can be specified across multiple logical entities enforces consistency across models, be it allowable values, constraints, and/or quality rules. For example, Employee Birth Country (e.g., attribute 182 (FIG. 1D)), Country Code (e.g., attribute 150), and/or Address Country Code (e.g., attribute 160) may have the same data requirement (e.g., ISO 3-Letter Country Code).

FIG. 1C also includes metadata management domain 162. Metadata may describe conceptual, logical, and/or physical data models and structures, business processes, data rules and constraints, data concepts, relationships, and lineage and may be described enterprise-wide via the standardized language. However, using the same language does not guarantee compatible models. For example, the system must ensure that data quality rules such as "notional is greater than zero" are expressed the same way across systems, the system may create a set of pre-defined metadata templates using the standardized language. These pre-defined metadata templates may comprise "metadata requirements."

Metadata management domain 162 may comprise metadata requirements for data governance. Metadata management domain 162 may comprise three types of metadata requirements: business metadata requirements (e.g., requirement 164), technical metadata requirements (e.g., requirement 166), and operational metadata requirements (e.g., requirement 168). Business metadata requirements (e.g., requirement 164) may comprise data attributes with business meaning (e.g., Business Effective Date) that are added to one or more physical data models (e.g., physical data model 180 (FIG. 1D)). Business metadata (also called descriptive metadata) may be used to define business concepts, interactions, and/or processes (e.g., products, clients, customers, legal entities, contracts, accounts, transactions, events, etc.). Examples of business metadata include conceptual and logical data models, data quality rules, data security and privacy rules, and/or data transformation rules.

For example, a business metadata requirement (e.g., requirement 164) may comprise a producer data contract (PDC). For example, a data producer must register a PDC for publication. The PDC must include an application identity, a data model constrained by a logical data model and other metadata requirements, the location of the publication, and a service-level agreement (SLA). An SLA sets the expectations between the service provider and the customer and describes the products or services to be delivered, the single point of contact for end-user problems, and the metrics by which the effectiveness of the process is monitored and approved.

In another example, a business metadata requirement (e.g., requirement 164) may comprise a consumer data contract (CDC). For example, for a given PDC, there may be one or more consumers. Each data consumer must declare in a CDC, which includes the application identity of the consumer and the subset of the attributes or other filtering conditions based on the PDC the consumer subscribed to. For the same PDC, CDCs can differ on the attributes they select. The system may retrieve this information when creating a description for the metadata-rich data transfer package.

Technical metadata (also called structural metadata) may describe technology data assets at rest and in motion, representing physical implementation of the creation, organization, movement, change, and/or storage of the data, which may include, but is not limited to, physical data store deployments, physical data models (e.g., tables, indexes, keys, etc.), and/or data access rights, roles, and groups. Technical metadata requirements (e.g., requirement 166) may comprise data attributes used by technology governance (e.g., a System Time stamp indicating when the record is created or changed).

Operational metadata (also called administrative metadata) may describe the details of data processing and access and operational details by systems or environments, which may include, but is not limited to, data archiving and retention rules and/or document management metadata. Operational metadata requirements (e.g., requirement 168) may comprise data attributes used for operational purposes (e.g., a person/system that last changed the record).

FIG. 1D shows physical data model 180, which may be used by a data modeling platform (e.g., system 100 (FIG. 1A)). A physical data model indicates how database management technology may be used to map the logical data model, the design of the tables that will make up an actual database, and/or the keys that will represent the relationships between these tables. In some embodiments, physical data model 180 may represent a physical form of logical data model 140 (FIG. 1C). For a given logical data model, there may be more than one physical format (e.g., one or more physical data models 180). For example, Employee data (e.g., table 184) may be stored in a relational database table (e.g., Data-at-Rest (DaR)) or be represented as a message within a messaging service (e.g., Data-in-Motion (DiM)). At the physical data model (e.g., physical data model 180), additional attributes based on requirements from the metadata management domain (e.g., metadata management domain 162 (FIG. 1C)) are incorporated.

For example, employee data may be stored in a relational database table (e.g., table 184) or be represented as a JSON message (e.g., table 186) on a messaging bus. Physical data models (e.g., physical data model 180) may also include some additional attributes based on requirements from the metadata management domain (e.g., metadata management domain 162 (FIG. 1C)).

Physical data model 180 may also enforce referential integrity by establishing foreign key constraints (e.g., a requirement that links an attribute to one or more other attributes) between entities. As one example, the employee address (e.g., attribute 188) must refer to a valid address (e.g., as indicated by attribute set 190). For example, physical data models (e.g., physical data model 180) enforce referential integrity by establishing the necessary foreign key constraints between entities. As one example, the employee address must refer to a valid address as identified by the AddressId primary key.

FIGS. 2A-2J show illustrative diagrams for supplemental data structures for the first logical data model, in accordance with one or more embodiments. For example, FIGS. 2A-2J show supplemental data structures as described by a standardized language script set, which may be generated from taxonomy/controlled vocabulary. In some embodiments, standardized language script sets may be compiled using a UML. For example, FIGS. 2A-2J may show both supplemental data structures and the standardized language scripts used to express those supplemental data structures. For example, the standardized language scripts may comprise internal data modelers that a data modeling platform may use to create supplemental data structures that may support one or more non-standardized data models. For example, the standardized language scripts may support primitive attribute types such as String, Integer, Float, Boolean, DateTime, Date, etc.

The supplemental data structures may comprise one or more modeling standards that may be expressed via the UML. For example, UML is a very rich modeling language that can be used to model all aspects of technical and non-technical systems including behaviors, activities, interactions, deployments etc. The system may use a small subset of the UML that is relevant to precise platform-independent logical data modeling. In order to ensure that only modeling constructs from the relevant subset of UML are used so that the models do not include irrelevant detail, a specific UML subset may be defined. UML may use a formal expression language such as OCL (Object Constraint Language), or a subset thereof, which must be used to formalize with one or more technical or non-technical rules.

Figure 2A:
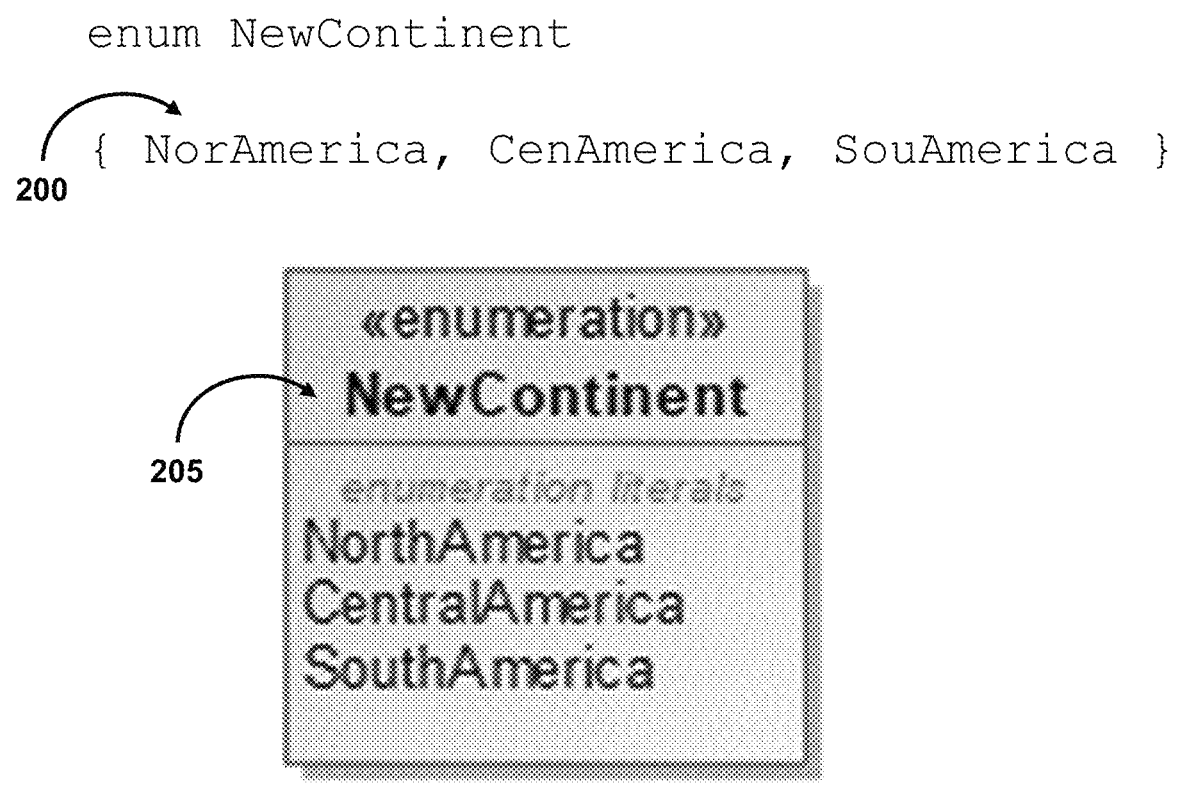
FIGS. 2A-2J show illustrative diagrams for supplemental data structures for the first logical data model, in accordance with one or more embodiments.

For example, FIG. 2A shows standardized modeling language script set 200 and supplemental data structure 205. FIG. 2A describes enumeration in the standardized modeling language script. In particular, FIG. 2A describes enumeration (e.g., as a set of fixed related constants) for the standardized modeling language script. That is, the standardized modeling language scripts used to create supplemental data structures may use a set of fixed constants to count or recite numbers or a numbered list.

Figure 2B:
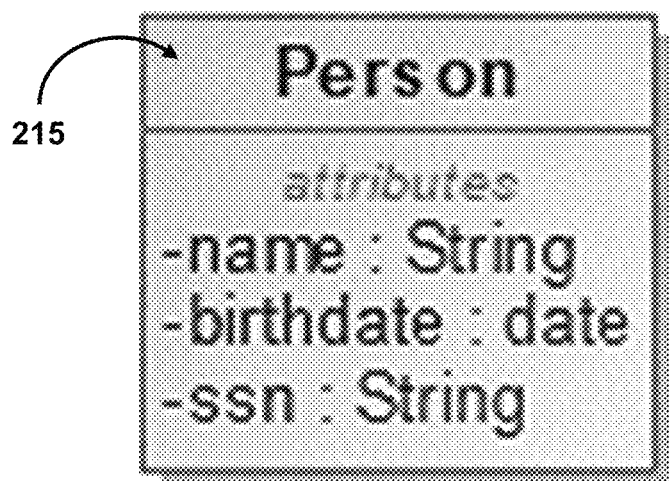

For example, FIG. 2B shows standardized modeling language script set 210 and supplemental data structure 215. FIG. 2B describes class attributes of the standardized modeling language script. In particular, FIG. 2B describes how classes are defined as a collection of attributes. For example, as shown in FIG. 2B, the basic construction of a class (e.g., via a named list of data attributes) has been used to define a class named "Person."

Figure 2C:
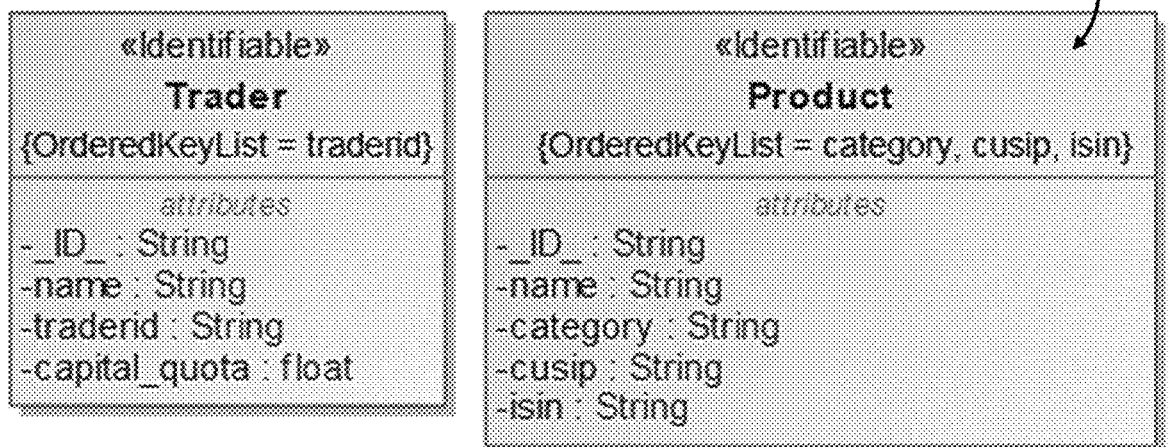

For example, FIG. 2C shows standardized modeling language script set 220 and supplemental data structure 225. FIG. 2C describes the key creation in the standardized modeling language script. In particular, FIG. 2C describes identifiable classes that have attributes as keys. For example, similar to a database table which has some columns as natural keys, an identifiable class is a class with one or more of its attributes designated as its natural key. The natural key uniquely identifies the instance of the class. Every identifiable class object may also have a mandatory_ID_attribute, which will uniquely identify this object. The_ID_attribute will be of String type.

Figure 2D:
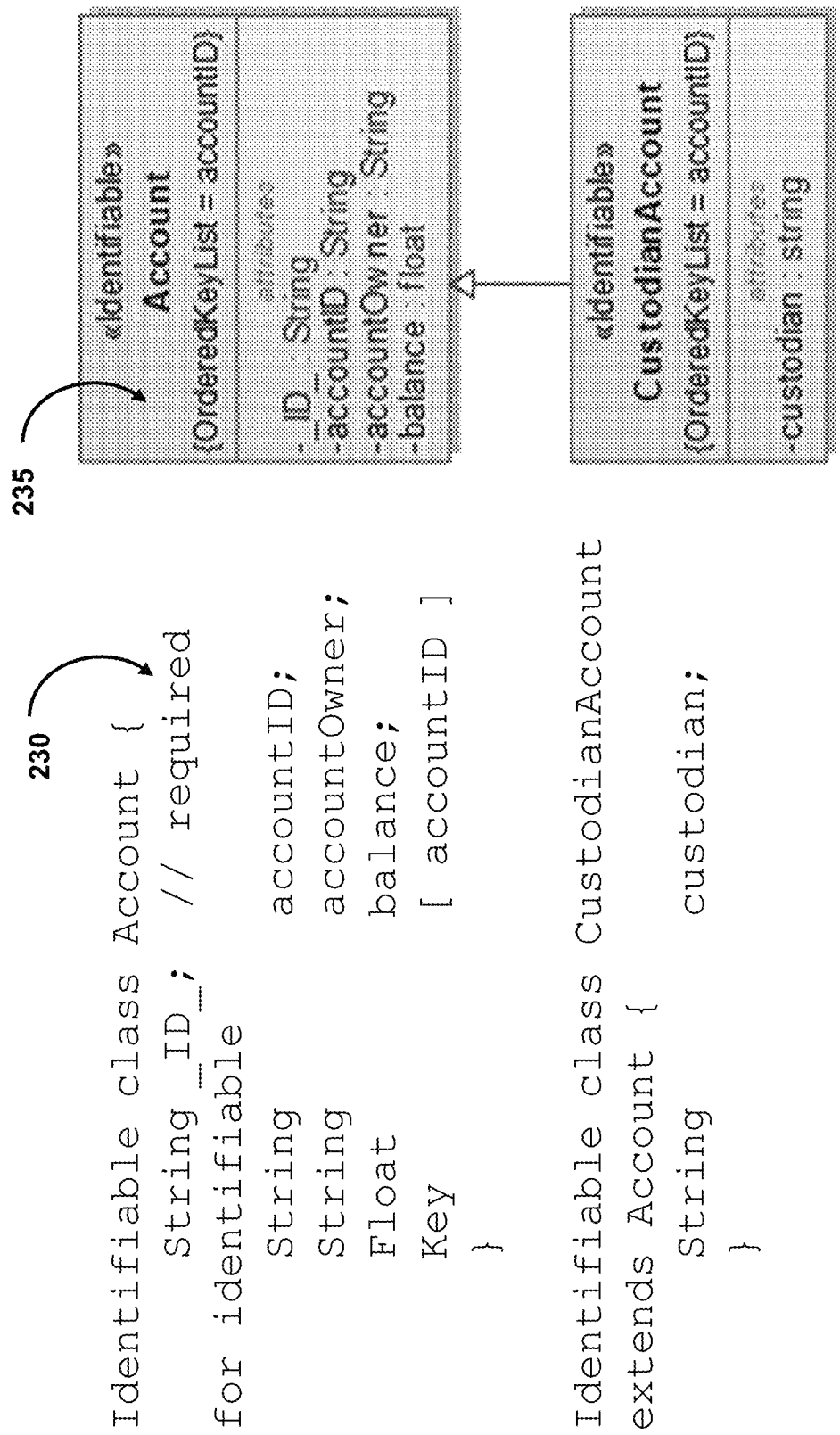

For example, FIG. 2D shows standardized modeling language script set 230 and supplemental data structure 235. FIG. 2D describes the key creation in the standardized modeling language script. In particular, FIG. 2D describes how to create one new class by extending another class. For example, one new class may extend from another class. In some embodiments, only one class may extend from another (e.g., no multiple inheritance). A new class may have all the attributes of its parent class while more attributes may be added.

Figure 2E:
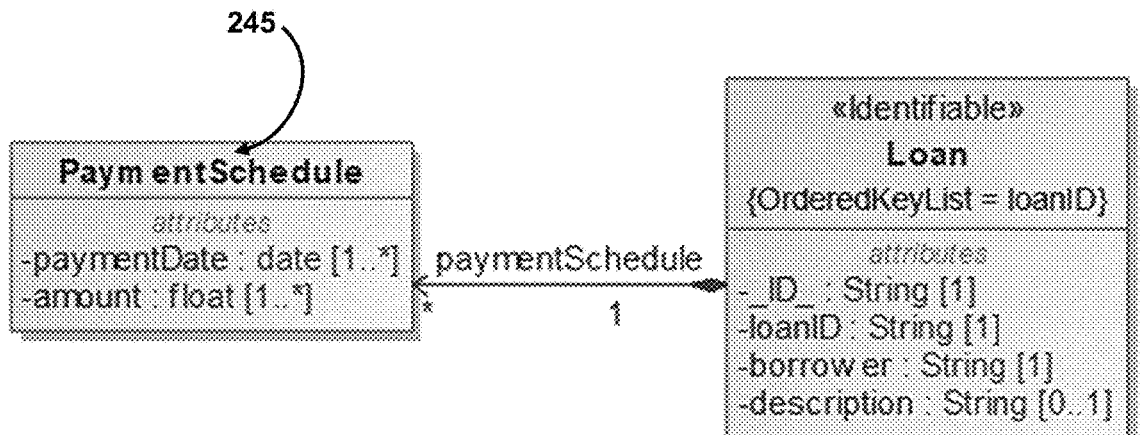

For example, FIG. 2E shows standardized modeling language script set 240 and supplemental data structure 245. FIG. 2E describes the class composition of the standardized modeling language script. For example, the system may build a new class by putting together attributes whose value types are of other user-defined classes (e.g., "Loan" includes "PaymentSchedule").

Figure 2F:
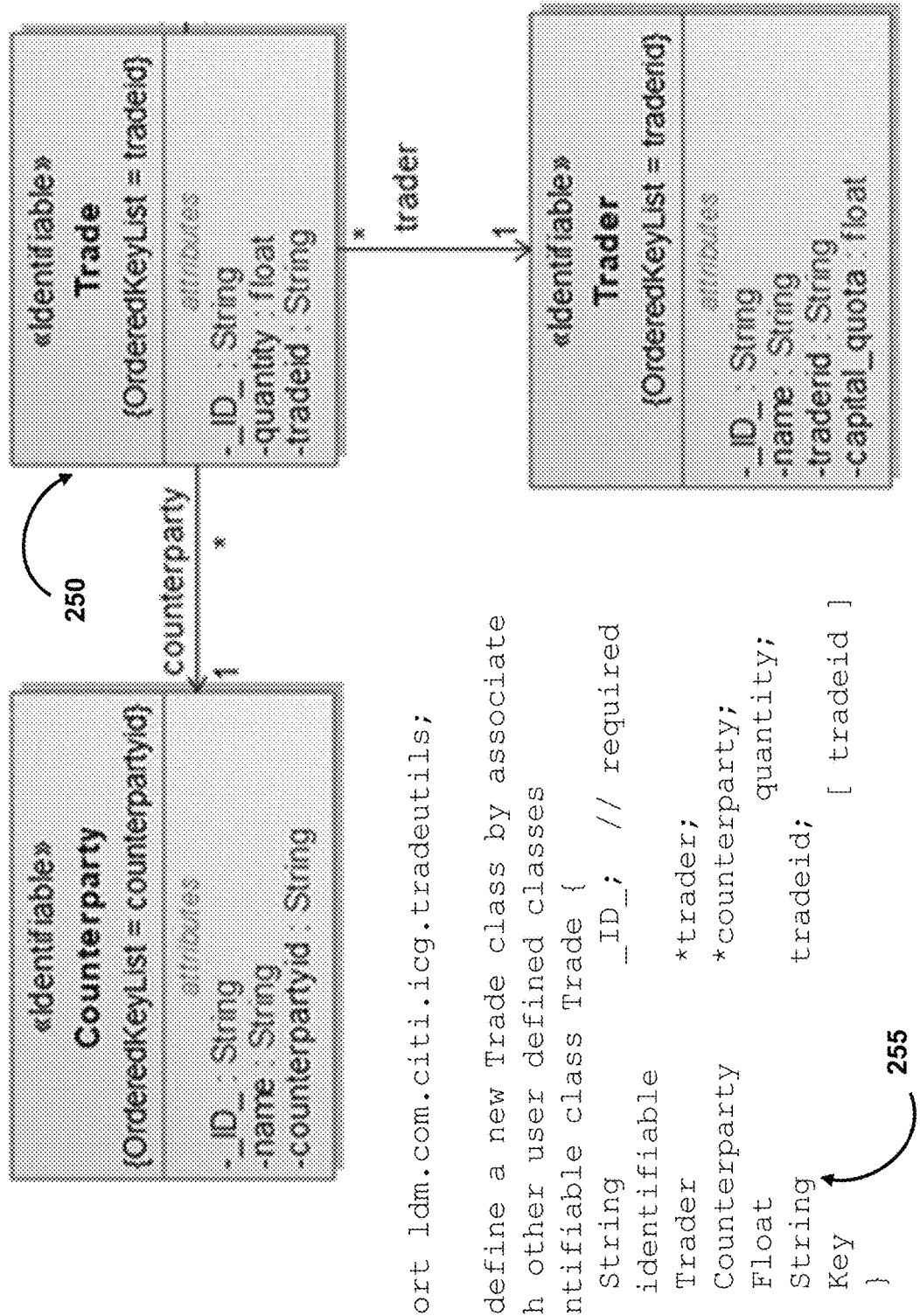

For example, FIG. 2F shows standardized modeling language script set 250 and supplemental data structure 255. FIG. 2F describes the class association in the standardized modeling language script. For example, class construction may include association(s) with other user-defined class(es). This construction may only be valid when the class being associated with is an identifiable class. For example, to associate with a non-identifiable class is ill formed, as associations represent the relationship among objects.

Figure 2G:
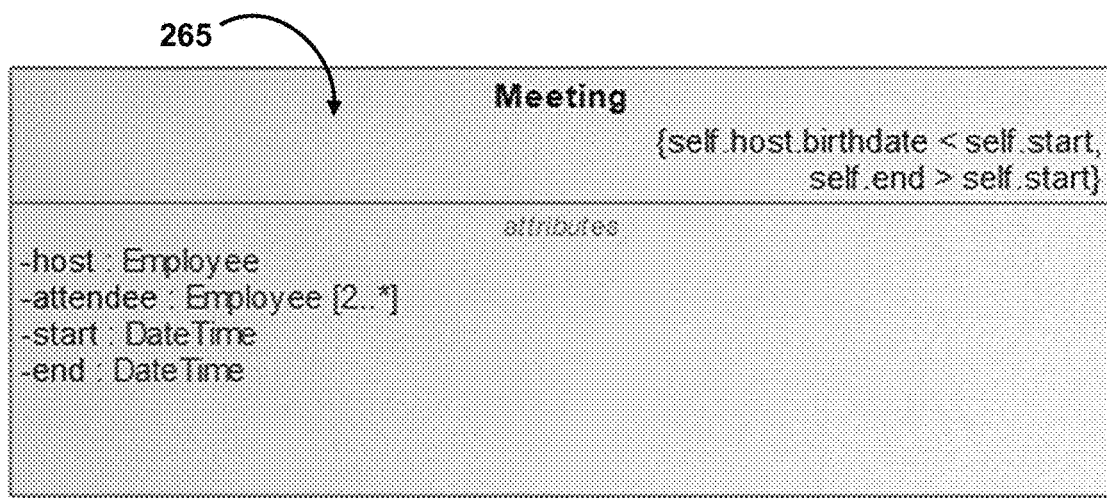

For example, FIG. 2G shows standardized modeling language script set 260 and supplemental data structure 265. FIG. 2G describes the model attribute modifiers in the standardized modeling language script. For example, an attribute modifier may be used to indicate properties such as multiplicity, required values, optional values, etc. Multiplicity of values is allowed (e.g., via notation [1 . . . 10] to represent 1 to 10 values; to denote a mandatory attribute, the system may use [1] and an optional value such as [0 . . . 1]).

Figure 2H:
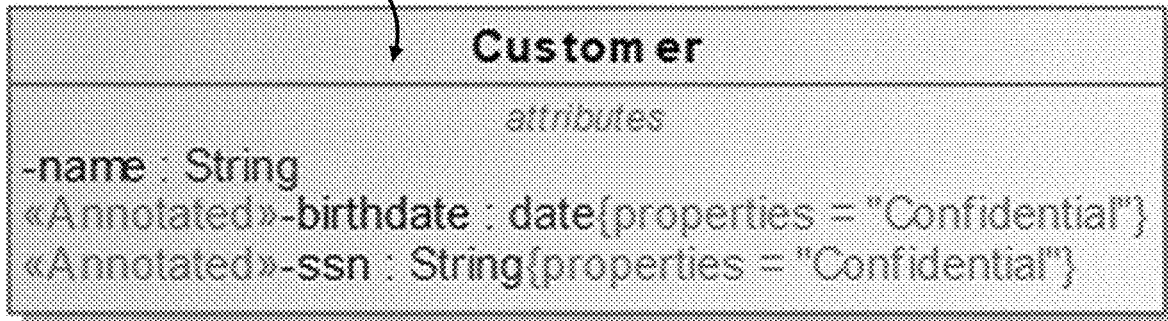

For example, FIG. 2H shows standardized language script set 270 and supplemental data structure 275. FIG. 2H describes class and attribute invariance in the standardized modeling language script. For example, the invariant is a predicate in the form of a logical expression that all objects of the data model must satisfy. In the system, all invariants may be expressed in an OCL, which may be used to express constraints or data quality rules.

Figure 2I:
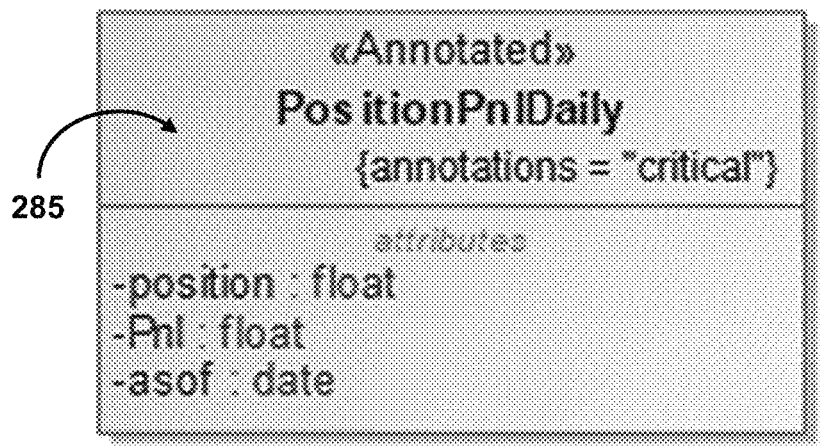

For example, FIG. 2I shows standardized language script set 280 and supplemental data structure 285. FIG. 2I describes annotation of attributes in the standardized modeling language script. For example, a model attribute may be associated with customizable/user-defined tags. These tags are defined as annotations. For example, as shown in FIG. 2I, the system has annotated attributes to be "confidential."

Figure 2J:
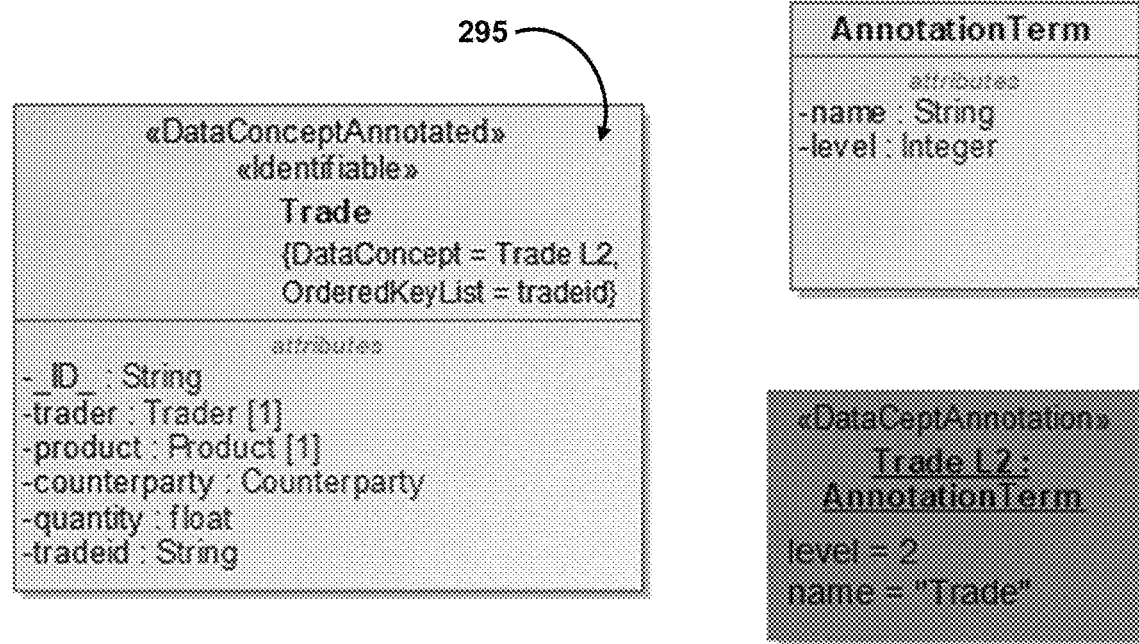

For example, FIG. 2J shows standardized modeling language script set 290 and supplemental data structure 295. FIG. 2J describes annotation of classes in the standardized modeling language script. For example, a class itself may be associated with customizable/user-defined tags. As shown in FIG. 2J, a data concept class has annotations including qualifiers for classification.

Figure 3A:
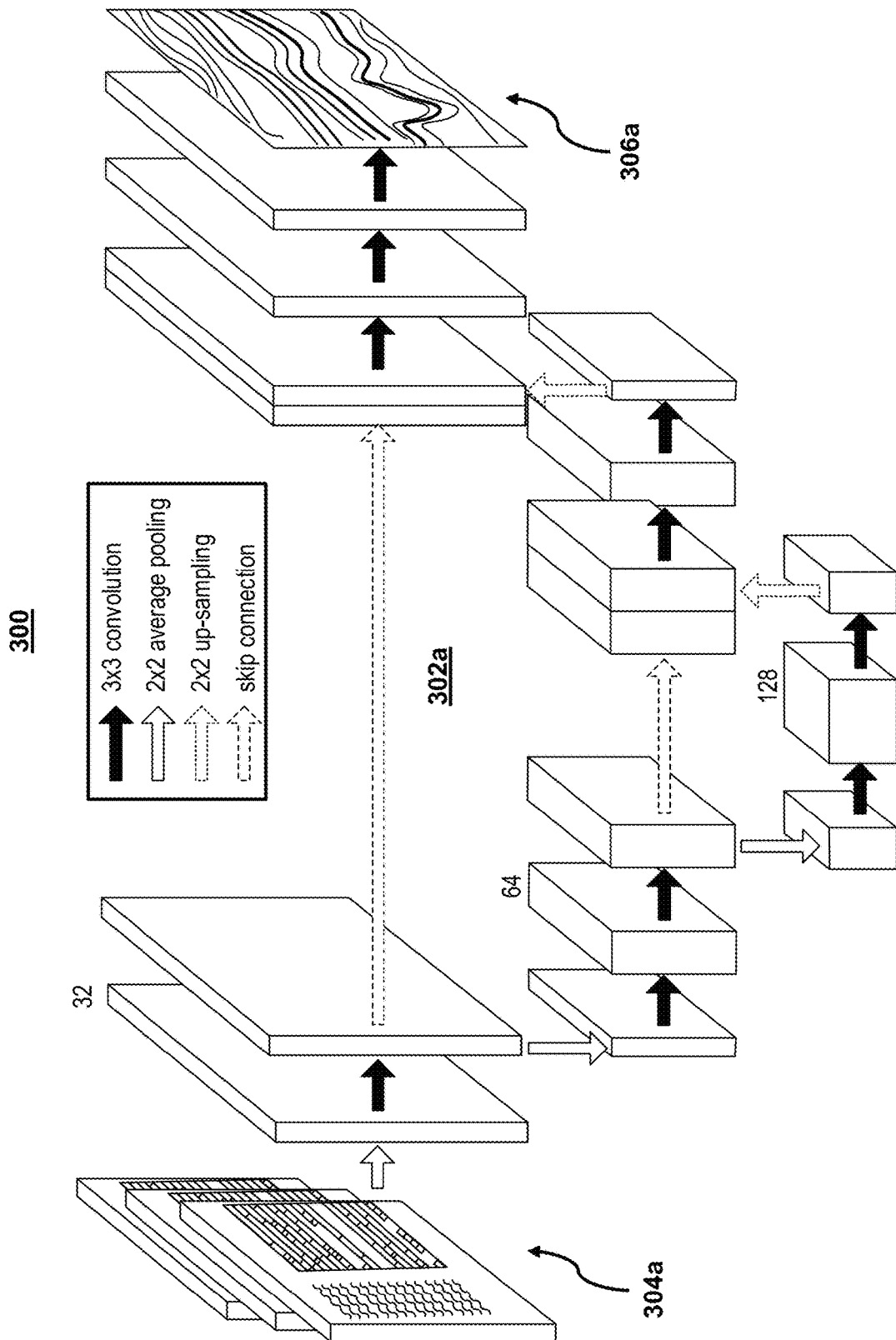
FIGS. 3A-3B show illustrative components for a system used to support data modeling platform activities, in accordance with one or more embodiments.
Figure 3B:
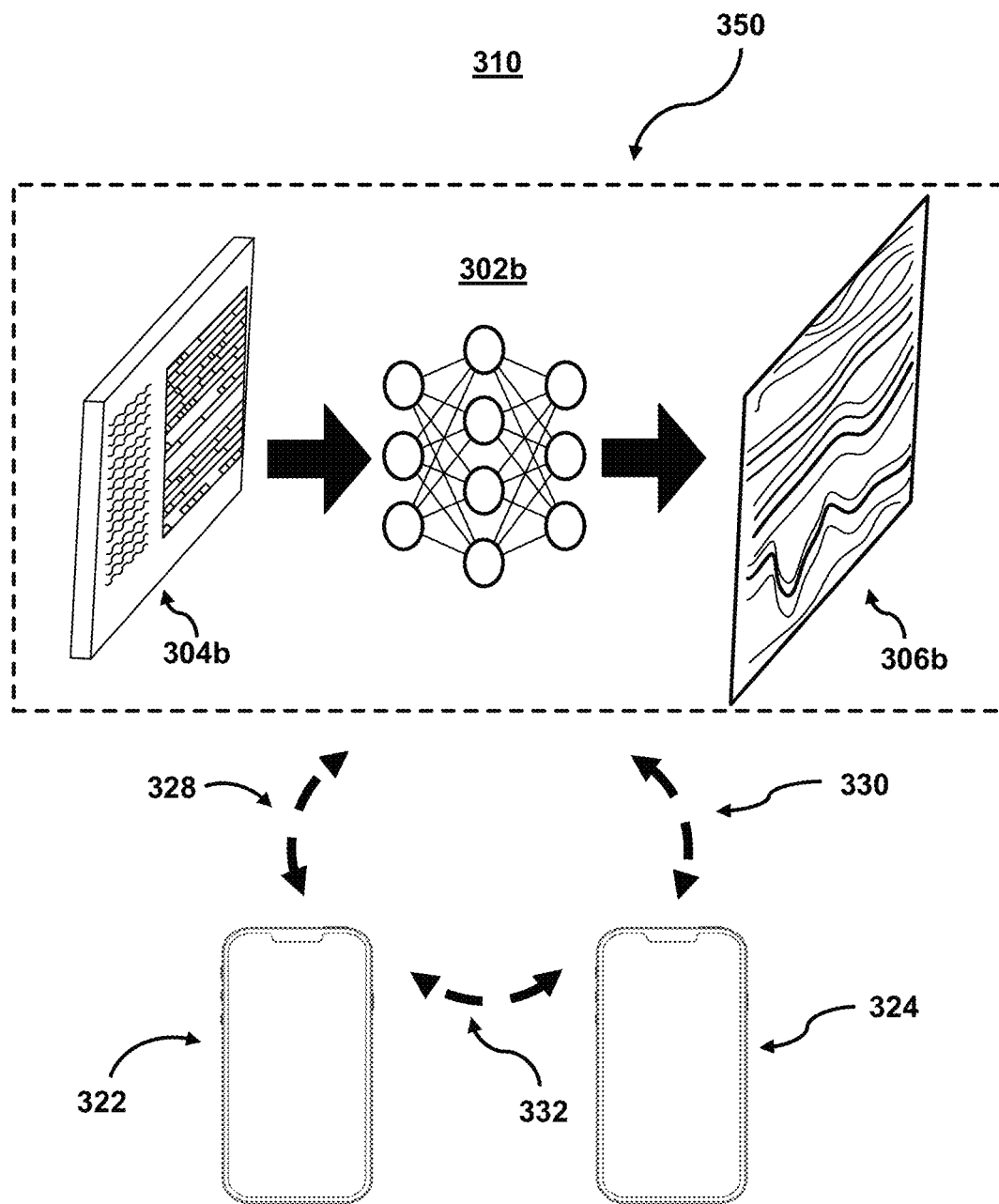

FIGS. 3A and 3B shows illustrative components for a system used to support data modeling platform activities, in accordance with one or more embodiments. For example, FIG. 3A may show illustrative components used to support data modeling platform activities. As shown in FIG. 3B, system 300 may include mobile device 322 and mobile device 324. While shown as smartphones in FIG. 3B, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system, and may feature one or more component devices. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3B, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, programming language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

System 300 also includes model 302a, which may be a machine learning model, artificial intelligence model, etc. (which may be referred collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 30a6, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a mapping of a logical data model to a platform data model, whether or not a data model corresponds to a given data structure characteristic, whether or not a dataset corresponds to a given data characteristic, etc.).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to map a logical data model to a platform data model, determine whether a data model corresponds to a given data structure characteristic, determine whether a dataset corresponds to a given data characteristic, etc.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., a mapping of a logical data model to a platform data model, whether or not a data model corresponds to a given data structure characteristic, whether or not a dataset corresponds to a given data characteristic, etc.).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
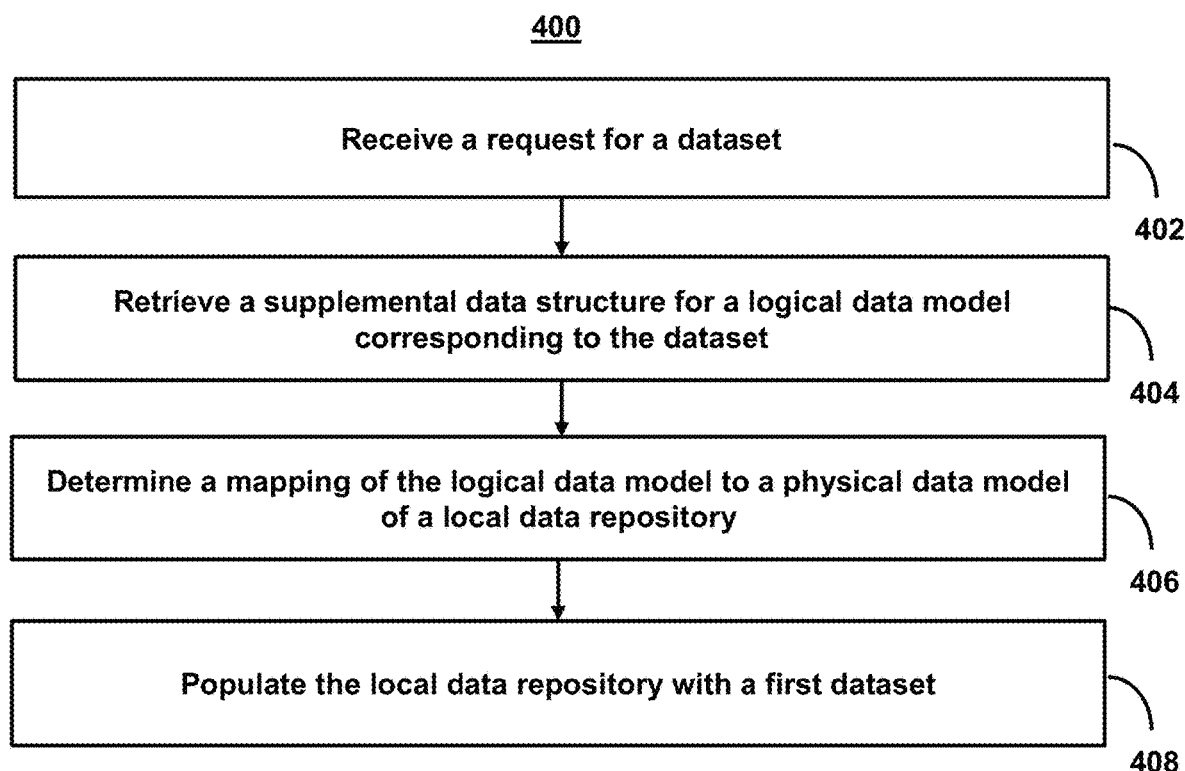
FIG. 4 shows a flowchart of the steps involved in generating data transfers using programming language-agnostic data modeling platforms, in accordance with one or more embodiments.

FIG. 4 shows a flowchart of the steps involved in generating data transfers using programming language-agnostic data modeling platforms, in accordance with one or more embodiments. For example, the system may use process 400 (e.g., as implemented on one or more system components described above) in order to generate data transfers using programming language-agnostic data modeling platforms.

At step 402, process 400 (e.g., using one or more components described above) receives a request for a dataset. For example, the system may receive a first request to populate a first local data repository with a first dataset from a first data source, wherein the first data source uses a first logical data model, and wherein the first local data repository has a first physical data model. For example, the programming language-agnostic data modeling platform may receive a request (e.g., a request from an API for a first local data repository) requesting a data transfer.

In some embodiments, the system may retrieve a logical data model from a plurality of logical data models. For example, the system may store one or more data models that correspond to a given conceptual data model. For example, the system may, in response to the first request, determine that the first data source uses a first logical data model. Based on determining that the first data source uses the first logical data model, the system may select the first logical data model from a plurality of logical data models, wherein the plurality of logical data models correspond to a first conceptual data model.

In some embodiments, the logical data model may be based on a conceptual data model. For example, a conceptual data model indicates how entities are represented and determines the relationships between them. The logical data model indicates for an entity the attributes and relationships between the attributes. The physical data model indicates how the attributes are mapped to tables of destination databases. For example, the first conceptual data model may indicate a first relationship between a first entity and a second entity, wherein the first mapping maps the first attribute to a table of the first physical data model.

In some embodiments, the system may enforce one or more data requirements across an entity. For example, the system may determine that an entity comprises a set of common data requirements across its entities. For example, the system may determine a first entity for the first attribute. The system may determine a first data requirement for the first attribute based on the first entity.

At step 404, process 400 (e.g., using one or more components described above) retrieves a supplemental data structure for a logical data model corresponding to the dataset. For example, the system may, in response to the first request, retrieve a first supplemental data structure for the first logical data model, wherein the first supplemental data structure is expressed in a standardized modeling language and comprises a first attribute, and wherein the first attribute comprises a first transformer lineage of the first logical data model. For example, the supplemental data structure may comprise logical data modeling metadata, in which the logical data modeling metadata is mapped from the standardized modeling language of the logical data model to common, standardized programming languages that are compatible with a plurality of APIs.

In some embodiments, the system may access a metadata management domain to retrieve the supplemental data structure. For example, the metadata may describe conceptual, logical, and/or physical data models and structures, business processes, data rules and constraints, data concepts, relationships, and/or lineage via a standardized language. For example, when retrieving the first supplemental data structure for the first logical data model, the system may query a metadata management domain for the first supplemental data structure and retrieve the first supplemental data structure from a plurality of supplemental data structures stored at the metadata management domain, wherein each of the plurality of supplemental data structures corresponds to a respective logical data model.

In some embodiments, the first supplemental data structure may express in the standardized language numerous details about an enterprise. For example, the system may use a common language in which all metadata will be described enterprise-wide. Such a language may leverage international standard specifications to enforce interoperability and enable programmatic enforcement of governed data definitions. The language may be in a machine-readable format. This standardized modeling language approach facilitates the representation and exchange of models and related metadata: the structure of the metadata registry, the description of a data element's contextual location in an overarching data model, and/or relationships between domains, entities, and attributes. Additionally or alternatively, technical components which participate in the end-to-end production, processing, and consumption of data will conform to the metadata standards. For example, this standardization will enforce consistency in the product of modeling activities across the enterprise and facilitate their central storage in an enterprise-wide registry, ensure that all data assets (in place and in motion) are described with the same methodology and standard to enable consistent metadata storage and exchange, and enable programmatic interactions with metadata by all data capabilities, fundamental in achieving reliable and trustworthy data through implementation and operation of standardized technical components supporting the end-to-end data lifecycle. For example, the first supplemental data structure may express in the standardized language a location of the first attribute in the first logical data model and a set of relationships between the first attribute and entities of the first logical data model, other attributes in the first logical data model, and a metadata management domain.

In some embodiments, the system may enforce one or more data requirements across attributes of a common type. For example, the system may determine an attribute of a first type in a plurality of entities and set common data requirements. For example, while different subject matter experts may be assigned to specific child entities, governance at the parent level ensures "normalization" of common attributes and data requirements. For example, the system may determine a first data requirement for the first attribute based on the first entity. The system may determine a first data type of the first attribute. The system may search attributes of a second entity for data types corresponding to the first data type. The system may determine that a second attribute of the attributes of the second entity comprises the first data type. The system may assign the first data requirement to the second attribute based on determining that the second attribute of the attributes of the second entity comprises the first data type.

In some embodiments, the system may enforce one or more data requirements across attributes of a common type across multiple logical data models. For example, logical data models may share common attributes where the data requirements are applied consistently regardless of which model the attribute appears in. For example, the system may determine a first data requirement for the first attribute. The system may determine a first data type of the first attribute. The system may determine that a second attribute in a second logical data model comprises the first data type. The system may assign the first data requirement to the second attribute based on determining that the second attribute in the second logical data model comprises the first data type.

In some embodiments, the system may retrieve one or more data requirements from a metadata management domain. For example, at the physical data model, additional attributes based on requirements from the metadata management domain may be incorporated. For example, the system may retrieve a first data requirement for the first attribute from a metadata management domain. The system may process data from the first dataset for the first attribute based on the first data requirement.

In some embodiments, the system may apply data governance based on the metadata management domain. For example, data governance may comprise changes in models and metadata that are dependent on decisions made by data owners, stewards, and custodians in the data governance process. Metadata management may integrate with the systems supporting the data governance process in order to inform and/or drive acceptance or rejection of changes. For example, when processing the data from the first dataset for the first attribute based on the first data requirement, the system may determine a data owner for the first attribute and determine, by the data owner, that the data is approved for populating the first local data repository.

In some embodiments, the system may enforce referential integrity by establishing foreign key constraints (e.g., a requirement that links an attribute to one or more other attributes) between entities. For example, the system may determine a first data requirement for the first attribute. The system may determine a second data requirement for the first attribute based on the first data requirement.

At step 406, process 400 (e.g., using one or more components described above) determines a mapping of the logical data model to a physical data model of a local data repository. For example, the system may determine a first mapping of the first logical data model to the first physical data model by mapping the first attribute to the first physical data model. For example, the first transformer lineage may map a data flow of data from the first data source to the first local data repository, wherein the first transformer lineage is based on the first logical data model and the first physical data model. For example, the transformer lineage in the supplemental data structure that may include conversions, formatting, and/or a lineage of changes thereto that are performed on data received, processed, and/or outputted by the logical data model according to the standardized modeling language, but in a format that is compatible with standardized programming languages. Using the supplemental data structure, the system may determine how data in the logical data model should be mapped to the physical data model.

The supplemental data structure may describe numerous types of attributes. As one example, the supplemental data structure may describe transformer lineages for data. For example, transformer lineages may map a data flow of data from a data source to a destination (e.g., a local data repository). The transformer lineage may be specific to a logical data model of a data source and a physical data model of a destination. For example, the first transformer lineage may be selected based on the data transformations required to move data from the first logical data model to the first physical data model. For example, starting at the data origin, data lineage shows what happens to the data and where it moves. This tracking may include the complex transformations that happen in analytics pipelines with a variety of data sources and destinations. Due to massive volumes of unstructured data and complex transformation algorithms, debugging an analytics pipeline is difficult and expensive. Data lineage facilitates efficient debugging because it creates a record of data's origin, where it has moved, and how it is processed. Data lineage data also enables data users to audit and attribute the sources of their data for analytics and tasks related to data governance, data management, and data provenance; provides transparency into data quality by revealing data derivations and relationships; allows business users to track the creation of data assets for regulatory purposes; and/or facilitates data tracing for implementing changes such as systems migrations.

In some embodiments, data lineage maps the lifecycle of data as it moves from source to destination. In a typical data flow, that mapping may include, but is not limited to, data sources (e.g., APIs, CSVs, data warehouses, third-party apps, etc.), data transformations (e.g., CSV to XML, audio to text, character encoding, etc.), data storage locations (e.g., files, data lakes, databases, etc.), third-party tool integrations, and/or indirect and direct data dependencies.

At step 408, process 400 (e.g., using one or more components described above) populates the local data repository with a first dataset. For example, the system may populate the first local data repository with the first dataset based on the first mapping. By doing so, the system may download data in an efficient manner. For example, the system may generate and transfer a data transfer package that include data used to populate the local data repository.

In some embodiments, the system may enforce one or more data requirements. For example, the logical data model may indicate data requirements for a given entity. The data requirements for attributes may then be determined (e.g., by the system) based on the data requirements for the entity. For example, the logical data model may apply data inheritance. For example, data inheritance means that objects of the same class can inherit data from their parent objects in the object tree (e.g., data model). For example, the system may determine a first data requirement for a first entity in the first logical data model. The system may apply the first data requirement to the first attribute based on the first entity comprising the first data requirement.

In some embodiments, the data requirement may comprise a data quality rule. For example, the data requirement may require measuring of different data quality dimensions, such as: the contextual accuracy of values (correctness, accuracy); the consistency among values (consistency); the allowed format of values (representational consistency, accuracy); and/or the completeness of values. For example, determining the first data requirement may comprise the system determining an accuracy of the first attribute and comparing the accuracy to a threshold accuracy.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
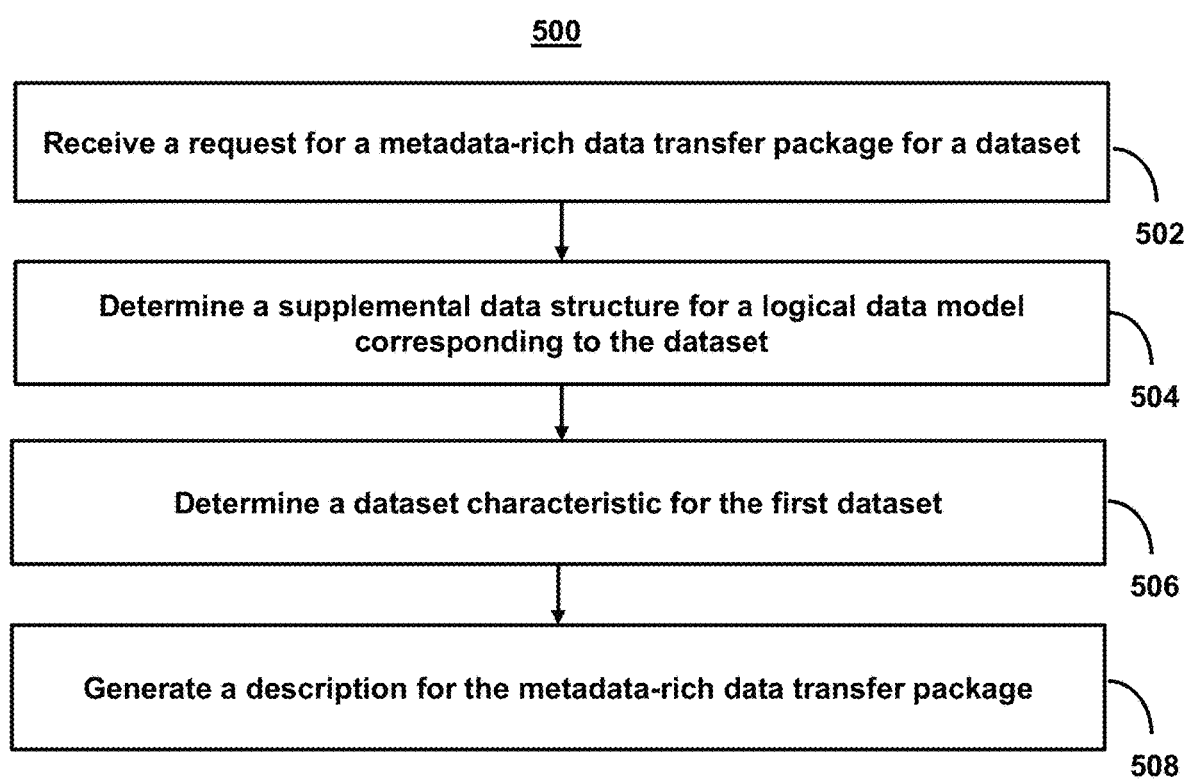
FIG. 5 shows a flowchart of the steps involved in providing metadata-rich data transfers based on logical data models, in accordance with one or more embodiments.

FIG. 5 shows a flowchart of the steps involved in providing metadata-rich data transfers based on logical data models, in accordance with one or more embodiments. For example, the system may use process 500 (e.g., as implemented on one or more system components described above) in order to provide metadata-rich data transfers based on logical data models. In some embodiments, process 500 may describe a process for receive a data offering. The data offering may include a supplemental data structure that describes a logical data flow (e.g., where conceptual data is coming from, how it is being processed, etc.) of the data that is available at (as described in the data offering) at the conceptual data model. This logical data flow may include all (or at least, in one embodiment, hundreds of attributes, tags, fields, etc.) for the data that is described at the conceptual data model. The inclusion of the logical data flow ensures that recipients understand what data (e.g., specific fields) is included in a data transfer.

At step 502, process 500 (e.g., using one or more components described above) receives a request for a metadata-rich data transfer package for a dataset. For example, the system may receive a first request for a metadata-rich data transfer package for a first dataset from a first data source, wherein the first dataset is used to populate a first local data repository, wherein the first data source uses a first logical data model, and wherein the first local data repository has a first physical data model. For example, the system may receive a request (e.g., whether a one-time request and/or a request received on a predetermined and/or continuous basis). The request may be for data from one or more data streams and/or sources. For example, the system may enable a subscription to a data service that populates data as needed.

At step 504, process 500 (e.g., using one or more components described above) determines a supplemental data structure for a logical data model corresponding to the dataset. For example, the system may, in response to the first request, determine a first supplemental data structure for the first logical data model, wherein the first supplemental data structure is expressed in a standardized language and comprises a first attribute, and wherein the first attribute comprises a first transformer lineage of the first logical data model. In order to ensure that the data modeling platform is programming language-agnostic, the data modeling platform may be built upon a standardized modeling language. However, the standardized modeling language does not include the built-in program constraints and transformations for data model mappings characteristic of the proprietary solution discussed above. To overcome this technical deficiency, the system uses a supplemental data structure that comprises logical data modeling metadata, in which the logical data modeling metadata is mapped from the standardized modeling language of the logical data model to common, standardized programming languages that are compatible with a plurality of APIs.

The supplemental data structure may describe numerous types of attributes. As one example, the supplemental data structure may describe transformer lineages for data. For example, transformer lineages may map a data flow of data from a data source to a destination (e.g., a local data repository). The transformer lineage may be specific to a logical data model of a data source and a physical data model of a destination. For example, the first transformer lineage may be selected based on the data transformations required to move data from the first logical data model to the first physical data model. For example, starting at the data origin, data lineage shows what happens to the data and where it moves. This tracking may include the complex transformations that happen in analytics pipelines with a variety of data sources and destinations. Due to massive volumes of unstructured data and complex transformation algorithms, debugging an analytics pipeline is difficult and expensive. Data lineage facilitates efficient debugging because it creates a record of data's origin, where it has moved, and how it is processed. Data lineage data also enables data users to audit and attribute the sources of their data for analytics and tasks related to data governance, data management, and data provenance; provides transparency into data quality by revealing data derivations and relationships; allows business users to track the creation of data assets for regulatory purposes; and/or facilitates data tracing for implementing changes such as systems migrations.

In some embodiments, data lineage maps the lifecycle of data as it moves from source to destination. In a typical data flow, that mapping may include, but is not limited to, data sources (e.g., APIs, CSVs, data warehouses, third-party apps, etc.), data transformations (e.g., CSV to XML, audio to text, character encoding, etc.), data storage locations (e.g., files, data lakes, databases, etc.), third-party tool integrations, and/or indirect and direct data dependencies.

In some embodiments, the first supplemental data structure may express in the standardized language numerous details about an enterprise. For example, the system may use a common language in which all metadata will be described enterprise-wide. Such a language may leverage international standard specifications to enforce interoperability and enable programmatic enforcement of governed data definitions. The language may be in a machine-readable format. This standardized modeling language approach facilitates the representation and exchange of models and related metadata: the structure of the metadata registry, the description of a data element's contextual location in an overarching data model, and/or relationships between domains, entities, and attributes. Additionally or alternatively, technical components which participate in the end-to-end production, processing, and consumption of data will conform to the metadata standards. For example, this standardization will enforce consistency in the product of modeling activities across the enterprise and facilitate their central storage in an enterprise-wide registry, ensure that all data assets (in place and in motion) are described with the same methodology and standard to enable consistent metadata storage and exchange, and enable programmatic interactions with metadata by all data capabilities, fundamental in achieving reliable and trustworthy data through implementation and operation of standardized technical components supporting the end-to-end data lifecycle. For example, the first supplemental data structure may express in the standardized language a location of the first attribute in the first logical data model and a set of relationships between the first attribute and entities of the first logical data model, other attributes in the first logical data model, and a metadata management domain.

In some embodiments, the system may access a metadata management domain to retrieve the supplemental data structure. For example, the metadata may describe conceptual, logical, and/or physical data models and structures, business processes, data rules and constraints, data concepts, relationships, and/or lineage via a standardized language. For example, determining the first supplemental data structure for the first logical data model may comprise the system querying a metadata management domain for the first supplemental data structure and retrieving the first supplemental data structure from a plurality of supplemental data structures stored at the metadata management domain, wherein each of the plurality of supplemental data structures corresponds to a respective logical data model.

At step 506, process 500 (e.g., using one or more components described above) determines a dataset characteristic for the first dataset. For example, the system may determine a first dataset characteristic for the first dataset based on the first transformer lineage. For example, the first transformer lineage may map a data flow of data from the first data source to the first local data repository, wherein the first transformer lineage is based on the first logical data model and the first physical data model. For example, using the attributes, fields, tags, and/or other metadata described in the supplemental data structure, the system may determine dataset characteristics (e.g., the attributes, fields, tags, and/or other metadata) in the dataset. Notably, such information would not be available in conventional systems for datasets as the characteristics would be limited to those described by a conceptual data model.

In some embodiments, the first transformer lineage may allow for coarse-grained and/or fine-grained lineage analysis. Coarse-grained data lineage shows and describes the connections between pipelines, tables, and databases. Fine-grained lineage goes deeper into the data flow and shows the details of transformations applied to data. The system may use this data to run queries to determine the value of inputs or outputs. For example, to determine inputs based on the outputs that they are producing, the system may run a backward tracing query. This type of query may be used by the system when looking for bugs in its code or the dataset. For example, determining the first dataset characteristic for the first dataset based on the first transformer lineage may comprise the system determining an input value used to create the first dataset and determining an output value used to create the first dataset.

In some embodiments, the system may measure different data quality dimensions, such as: the contextual accuracy of values (correctness, accuracy); the consistency among values (consistency); the allowed format of values (representational consistency, accuracy); and/or the completeness of values. For instance, to validate the correctness of a given sequence, the system may test the logic of the process that created the data. For example, determining the first dataset characteristic for the first dataset based on the first transformer lineage may comprise the system determining an accuracy of data related to the first attribute and comparing the accuracy to a threshold accuracy.

In some embodiments, the system may use the lineage to determine where data is coming from (e.g., the source(s) of the data, how data is being processed and/or whether that process is correct, and/or what relationships exist between data). For example, determining the first dataset characteristic for the first dataset based on the first transformer lineage may comprise the system determining a processing route used to create the first dataset and validating the processing route.

At step 508, process 500 (e.g., using one or more components described above) generates a description for the metadata-rich data transfer package. For example, the system may generate a first description for the metadata-rich data transfer package based on the first dataset characteristic. For example, when generating the first description for the metadata-rich data transfer package based on the first dataset characteristic, the system may determine a PDC based on the first dataset characteristic, wherein the PDC comprises an application identifier and a location of a publication of an SLA. The system may query the location to validate the publication of the SLA. For example, a business metadata requirement may comprise a PDC. For example, a data producer must register a PDC for publication. The PDC must include an application identifier, a data model constrained by a logical data model, and other metadata requirements, as well as the location of the publication and the SLA. For example, as the system may now determine attributes, fields, tags, and/or other metadata for data in the logical data model using the supplemental data structure, the system may generate description for any data transfer packages.

In some embodiments, the system may allow for details and/or characteristic of datasets in a metadata-rich data transfer package to be determined. For example, the system may allow for dataset characteristics to be compared against required data characteristics (or threshold data characteristics) to determine whether particular data requirements are met. The system may then generate a description (e.g., a quantitative or qualitative metric describing the dataset) based on this comparison. For example, generating the first description for the metadata-rich data transfer package based on the first dataset characteristic may comprise the system retrieving a threshold dataset characteristic and comparing the first dataset characteristic to the threshold dataset characteristic to generate the first description.

For example, supplemental data structures may describe conceptual, logical, and/or physical data models and structures, business processes, data rules, constraints, data concepts, relationships, and/or lineages via the standardized language. However, using the same language does not guarantee compatible models. For example, the system must ensure that data quality rules such as "notional is greater than zero" are expressed the same way across systems. To ensure that people and systems are describing the same type of metadata the same way, the system may create a set of pre-defined metadata templates using the standardized language. The system may retrieve a first attribute template from a plurality of attribute templates, wherein each attribute template of the plurality of attribute templates describes metadata using the standardized language. The system may generate the first attribute based on the first attribute template.

For example, the system may create a set of pre-defined metadata templates using the standardized language. These templates may be used to define business concepts, interactions, and/or processes (e.g., products, clients, customers, legal entities, contracts, accounts, transactions, events). For example, the system may determine various data requirements for the first attribute based on the template (e.g., required conceptual and logical data models, data quality rules, data security and privacy rules, and/or data transformation rules). For example, the system may generate the first attribute based on the first attribute template and assign a data quality rule for the first attribute based on the first attribute template.

For example, the system may create a set of pre-defined metadata templates using the standardized language. These templates may be used to define details of data processing and access and operational details by systems or environments. For example, the system may determine various data requirements for the first attribute based on the template (e.g., required data archiving and retention rules and/or document management metadata). For example, the system may generate the first attribute based on the first attribute template and assign a data retention rule for the first attribute based on the first attribute template.

For example, the system may create a set of pre-defined metadata templates using the standardized language. These templates may be used to define descriptions of technology data assets at rest and in motion, representing physical implementation of the creation, organization, movement, change, and storage of the data. For example, the system may determine various data requirements for the first attribute based on the template (e.g., required physical data store deployments, physical data models (tables, indexes, keys, etc.), and/or data access rights, roles, and groups). In another example, the system may generate the first attribute based on the first attribute template and assign data access rights for the first attribute based on the first attribute template.

In some embodiments, the system may enforce referential integrity by establishing foreign key constraints (e.g., a requirement that links an attribute to one or more other attributes) between entities. For example, the system may determine a first data requirement for the first attribute. The system may determine a second data requirement for the first attribute based on the first data requirement.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
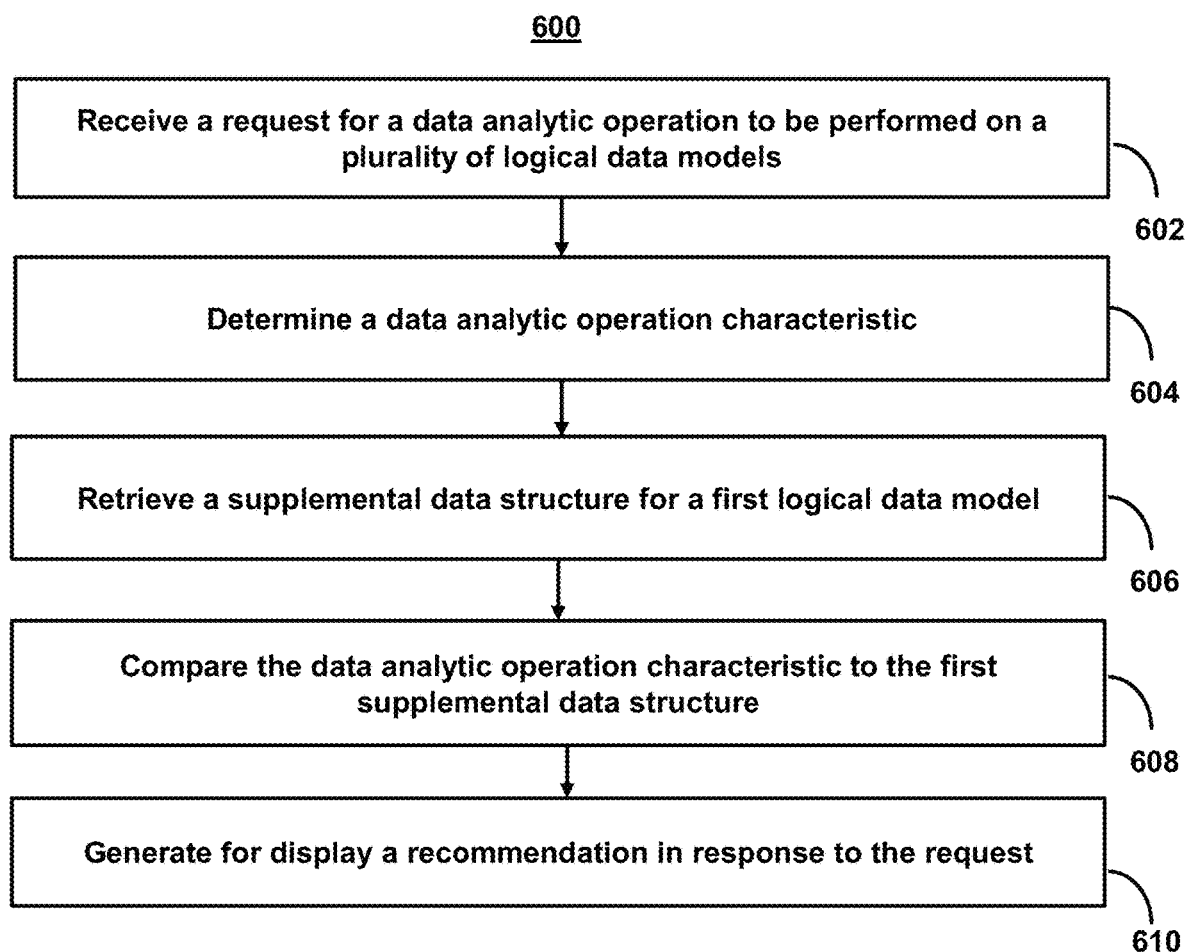
FIG. 6 shows a flowchart of the steps involved in providing database analytics on logical data models using supplemental data structures in accordance with one or more embodiments.

FIG. 6 shows a flowchart of the steps involved in providing database analytics on logical data models using supplemental data structures in accordance with one or more embodiments. For example, the system may use process 600 (e.g., as implemented on one or more system components described above) in order to provide database analytics on logical data models using supplemental data structures. For example, process 600 may describe performing searches on supplemental data structures that describe a logical data flow of a logical data model.

At step 602, process 600 (e.g., using one or more components described above) receives a request for a data analytic operation to be performed on a plurality of logical data models. For example, the system may receive a first request for a first data analytic operation to be performed using a plurality of logical data models, wherein each respective logical data model of the plurality of logical data models corresponds to a respective supplemental data structure that provides one or more transformer lineages of each respective logical data model in a standardized language.

For example, the model platform may receive a request for data at a physical data model that is requested based on logical data flow attributes (e.g., specific fields).

In some embodiments, the one or more transformer lineages may map data flows of data from a first data source to a first local data repository, wherein the one or more transformer lineages are based on a respective logical data model and a respective physical data model. The supplemental data structure may describe numerous types of attributes. As one example, the supplemental data structure may describe transformer lineages for data. For example, transformer lineages may map a data flow of data from a data source to a destination (e.g., a local data repository). The transformer lineage may be specific to a logical data model of a data source and a physical data model of a destination. For example, the first transformer lineage may be selected based on the data transformations required to move data from the first logical data model to the first physical data model. For example, starting at the data origin, data lineage shows what happens to the data and where it moves. This tracking may include the complex transformations that happen in analytics pipelines with a variety of data sources and destinations. Due to massive volumes of unstructured data and complex transformation algorithms, debugging an analytics pipeline is difficult and expensive. Data lineage facilitates efficient debugging because it creates a record of data's origin, where it has moved, and how it is processed. Data lineage data also enables data users to audit and attribute the sources of their data for analytics and tasks related to data governance, data management, and data provenance; provides transparency into data quality by revealing data derivations and relationships; allows business users to track the creation of data assets for regulatory purposes; and/or facilitates data tracing for implementing changes such as systems migrations.

In some embodiments, data lineage maps the lifecycle of data as it moves from source to destination. In a typical data flow, that mapping may include, but is not limited to, data sources (e.g., APIs, CSVs, data warehouses, third-party apps, etc.), data transformations (e.g., CSV to XML, audio to text, character encoding, etc.), data storage locations (e.g., files, data lakes, databases, etc.), third-party tool integrations, and/or indirect and direct data dependencies.

In some embodiments, the first supplemental data structure may express in the standardized language numerous details about an enterprise. For example, the system may use a common language in which all metadata will be described enterprise-wide. Such a language may leverage international standard specifications to enforce interoperability and enable programmatic enforcement of governed data definitions. The language may be in a machine-readable format. This standardized modeling language approach facilitates the representation and exchange of models and related metadata: the structure of the metadata registry, the description of a data element's contextual location in an overarching data model, and/or relationships between domains, entities, and attributes. Additionally or alternatively, technical components which participate in the end-to-end production, processing, and consumption of data will conform to the metadata standards. For example, this standardization will enforce consistency in the product of modeling activities across the enterprise and facilitate their central storage in an enterprise-wide registry, ensure that all data assets (in place and in motion) are described with the same methodology and standard to enable consistent metadata storage and exchange, and enable programmatic interactions with metadata by all data capabilities, fundamental in achieving reliable and trustworthy data through implementation and operation of standardized technical components supporting the end-to-end data lifecycle. For example, the first supplemental data structure may express in the standardized language a location of an attribute in the first logical data model and a set of relationships between the attribute and entities of the first logical data model, other attributes in the first logical data model, and a metadata management domain.

The system may then perform the first data analytic operation. The system may perform the first data analytic operation by determining a standardized template for performing the first data analytic operation and generating code for performing the first data analytic operation based on the standardized template. For example, the system may create a set of pre-defined standardized templates, using the standardized language, to perform data analytic operations. These templates may be used to define descriptions of technology data assets at rest and in motion, representing physical implementation of the creation, organization, movement, change, and storage of the data. For example, the system may determine various data requirements for the first attribute based on the template (e.g., required physical data store deployments, physical data models (tables, indexes, keys, etc.), and/or data access rights, roles, and groups).

In some embodiments, to enforce adherence to modeling and metadata standards during modeling and solution development by business analysts, data analysts, data engineers, software architects, and software engineers, a suite of enterprise-wide tools will be mandated by the system. This standard toolchain allows data requirements to be captured in the form of a data model by business analysts, data analysts, and others. These tools may be capable of generating metadata in the standard formats and specifications and supporting and enforcing the standard templates. The tools may be capable of participating in change management workflow driven by the metadata management domain. For example, a standard set of user tools for model authoring will allow for broad knowledge of a finite set of tools by model developers, consistent understanding of model development best practices, opportunities to lower cost through enterprise licensing, enforced adherence to the standardized metadata formats and specifications, and consistent integration with data governance and the metadata management domain. For example, the system may generate the standardized template by retrieving a standardized toolchain and generating metadata for the standardized template in a standard format and standardized specification.

In some embodiments, the system may generate code using a code repository. For example, with the data models defined in the data modeling platform in a machine-readable format, a code generation facility may be built to generate code artifacts that are consistent with the defined models. The code generation facility may support multiple programming languages, such as Java, Python, Scala, etc. Across these supported language bindings, the semantics may be the same. The generated code artifacts are published to the code repository as part of the SDLC process and then integrated into the applications. SDLC is the cost-effective and time-efficient process that development teams use to design and build high-quality software. The goal of SDLC is to minimize project risks through forward planning so that software meets customer expectations during production and beyond. For example, generating the code may comprise retrieving a code repository, wherein the code repository comprises a plurality of artifacts, and selecting an artifact from the plurality of artifacts.

An artifact may be used to generate code. For example, an artifact may be an immutable file, generated during a build or pipeline run in an automation server, which enables developers to reliably build, test, and deploy their software (e.g., as part of the SDLC process) or data. In another example, a code artifact may be a fully managed artifact repository service that makes it easy for organizations of any size to securely store, publish, and share software packages used in their software development process. In another example, an artifact may be a file uploaded by an agent during the execution of a build's job. The contents of the artifact can be retrieved using the download_url and the artifact download API. In another example, an artifact may be referenced in a pipeline stage for automated deployment to the target environment. They are used to specify software package versions for deployment. In another example, an artifact may be a SQL server artifact, which may be a collection of related SQL Server data. In another example, an artifact may be a build artifact. Build artifacts are files produced by a build. Typically, these include distribution packages, web archive (WAR) files, reports, log files, and so on. When creating a build configuration, the system may specify the paths to the artifacts of the build on the Configuring General Settings page. A web application is a group of HTML pages, JSP pages, servlets, resources, and source file, which can be managed as a single unit. A WAR file is a packaged web application. WAR files can be used to import a web application into a web server. In another example, an artifact may be stored in an artifact registry, which is a repository service for storing, sharing, and managing software development packages. With an artifact registry, the system may manage artifacts by making them immutable and identifying them with secure hash. For example, the artifact may be an immutable file used to build, test, or deploy data.

At step 604, process 600 (e.g., using one or more components described above) determines a data analytic operation characteristic. For example, the system may determine a first data analytic operation characteristic corresponding to the first data analytic operation. For example, the system may determine a type of data that is needed, being searched for, etc. and/or another required data characteristic in the request. Notably, in conventional systems, the data analytic operation characteristic would be limited to comparisons against data in a conceptual data model.

At step 606, process 600 (e.g., using one or more components described above) retrieves a supplemental data structure for a first logical data model. For example, the system may retrieve a first supplemental data structure for a first logical data model of the plurality of logical data models. In order to ensure that the data modeling platform is programming language-agnostic, the data modeling platform may be built upon a standardized modeling language. However, the standardized modeling language does not include the built-in program constraints and transformations for data model mappings characteristic of the proprietary solution discussed above. To overcome this technical deficiency, the system uses a supplemental data structure that comprises logical data modeling metadata, in which the logical data modeling metadata is mapped from the standardized modeling language of the logical data model to common, standardized programming languages that are compatible with a plurality of APIs.

In some embodiments, the system may access a metadata management domain to retrieve the supplemental data structure. For example, the metadata may describe conceptual, logical, and/or physical data models and structures, business processes, data rules and constraints, data concepts, relationships, and/or lineage via a standardized language. When retrieving the first supplemental data structure for the first logical data model, the system may query a metadata management domain for the first supplemental data structure and retrieve the first supplemental data structure from a plurality of supplemental data structures stored at the metadata management domain, wherein each of the plurality of supplemental data structures corresponds to a respective logical data model.

In some embodiments, the system may retrieve a logical data model from a plurality of logical data models. For example, the system may store one or more data models that correspond to a given conceptual data model. For example, when retrieving the first supplemental data structure for the first logical data model of the plurality of logical data models, the system may determine that the first data source uses the first logical data model, and, based on determining that the first data source uses the first logical data model, select the first logical data model from a plurality of logical data models, wherein the plurality of logical data models correspond to a first conceptual data model.

In some embodiments, the logical data model may be based on a conceptual data model. For example, a conceptual data model indicates how entities are represented and determines the relationships between them. The logical data model indicates for an entity the attributes and relationships between the attributes. The physical data model indicates how the attributes are mapped to tables of destination databases. For example, the first conceptual data model may indicate a first relationship between a first entity and a second entity, wherein the first relationship comprises a first attribute of the first logical data model that is mapped to a table of a first physical data model.

At step 608, process 600 (e.g., using one or more components described above) compares the data analytic operation characteristic to the first supplemental data structure. For example, the system may compare the first data analytic operation characteristic to a first transformer lineage of the first supplemental data structure. For example, as the system may now determine attributes, fields, tags, and/or other metadata for data in the logical data model using the supplemental data structure, the system may compare requirements made in a request (e.g., data analytic operation characteristic) to the attributes, fields, tags, and/or other metadata for data in the logical data model.

In some embodiments, the system may measure different data quality dimensions, such as: the contextual accuracy of values (correctness, accuracy); the consistency among values (consistency); the allowed format of values (representational consistency, accuracy); and/or the completeness of values. For instance, to validate the correctness of a given sequence, the system may test the logic of the process that created the data. For example, when comparing the first data analytic operation characteristic to the first transformer lineage of the first supplemental data structure, the system may determine an accuracy of data related to the first attribute and compare the accuracy to a threshold accuracy, wherein the recommendation comprises identifying that the accuracy exceeds the threshold accuracy.

At step 610, process 600 (e.g., using one or more components described above) generates for display a recommendation in response to the request. For example, the system may generate for display, on a user interface, a recommendation in response to the first request based on comparing the first data analytic operation characteristic to the first transformer lineage of the first supplemental data structure. For example, the first data analytic operation may comprise searching the plurality of logical data models for the first transformer lineage, wherein the first data analytic operation characteristic comprises the first transformer lineage, and wherein the recommendation may comprise identifying the first logical data model as comprising the first transformer lineage. For example, the recommendation may comprise information about what data is available, how data is mapped from a logical data model to a physical data model, how data is communicated from a logical data model to a physical data model, and/or other data characteristics about the logical data model and/or is creation, storage, and/or transfer to a physical data model.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating data transfers using programming language-agnostic data modeling platforms.
2. A method for providing metadata-rich data transfers based on logical data models.
3. A method for providing database analytics on logical data models using supplemental data structures.
4. The method of any one of the preceding embodiments, further comprising: receiving a first request to populate a first local data repository with a first dataset from a first data source, wherein the first data source uses a first logical data model, and wherein the first local data repository has a first physical data model; in response to the first request, retrieving a first supplemental data structure for the first logical data model, wherein the first supplemental data structure is expressed in a standardized language and comprises a first attribute, and wherein the first attribute comprises a first transformer lineage of the first logical data model; determining a first mapping of the first logical data model to the first physical data model by mapping the first attribute to the first physical data model; and populating the first local data repository with the first dataset based on the first mapping.
5. The method of any one of the preceding embodiments, further comprising: in response to the first request, determining that the first data source uses a first logical data model; and based on determining that the first data source uses the first logical data model, selecting the first logical data model from a plurality of logical data models, wherein the plurality of logical data models correspond to a first conceptual data model.
6. The method of any one of the preceding embodiments, wherein the first conceptual data model indicates a first relationship between a first entity and a second entity, and wherein the first mapping maps the first attribute to a table of the first physical data model.
7. The method of any one of the preceding embodiments, further comprising: determining a first data requirement for a first entity in the first logical data model; and applying the first data requirement to the first attribute based on the first entity comprising the first data requirement.
8. The method of any one of the preceding embodiments, wherein determining the first data requirement further comprises: determining an accuracy of the first attribute; and comparing the accuracy to a threshold accuracy.
9. The method of any one of the preceding embodiments, further comprising: determining a first entity for the first attribute; and determining a first data requirement for the first attribute based on the first entity.
10. The method of any one of the preceding embodiments, further comprising: determining a first data requirement for the first attribute based on the first entity; determining a first data type of the first attribute; searching attributes of a second entity for data types corresponding to the first data type; determining that a second attribute of the attributes of the second entity comprises the first data type; and assigning the first data requirement to the second attribute based on determining that the second attribute of the attributes of the second entity comprises the first data type.
11. The method of any one of the preceding embodiments, further comprising: determining a first data requirement for the first attribute; determining a first data type of the first attribute; determining that a second attribute in a second logical data model comprises the first data type; and assigning the first data requirement to the second attribute based on determining that the second attribute in the second logical data model comprises the first data type.
12. The method of any one of the preceding embodiments, wherein populating the first local data repository with the first dataset based on the first mapping further comprises: retrieving a first data requirement for the first attribute from a metadata management domain; and processing data from the first dataset for the first attribute based on the first data requirement.
13. The method of any one of the preceding embodiments, wherein processing the data from the first dataset for the first attribute based on the first data requirement further comprises: determining a data owner for the first attribute; and determining, by the data owner, that the data is approved for populating the first local data repository.
14. The method of any one of the preceding embodiments, further comprising: determining a first data requirement for the first attribute; and determining a second data requirement for the first attribute based on the first data requirement.
15. The method of any one of the preceding embodiments, wherein the first supplemental data structure expresses in the standardized language a location of the first attribute in the first logical data model and a set of relationships between the first attribute and entities of the first logical data model, other attributes in the first logical data model, and a metadata management domain.

16. The method of any one of the preceding embodiments, wherein retrieving the first supplemental data structure for the first logical data model further comprises: querying a metadata management domain for the first supplemental data structure; and retrieving the first supplemental data structure from a plurality of supplemental data structures stored at the metadata management domain, wherein each of the plurality of supplemental data structures corresponds to a respective logical data model.

17. The method of any one of the preceding embodiments, wherein the first transformer lineage maps a data flow of data from the first data source to the first local data repository, and wherein the first transformer lineage is based on the first logical data model and the first physical data model.

18. The method of any one of the preceding embodiments, wherein receiving the first request to populate the first local data repository with the first dataset from the first data source, further comprises: receiving a subscription request from the first data source; and in response to the subscription request, subscribing to a data service provided by the first data source.

19. The method of any one of the preceding embodiments, wherein receiving the first request to populate the first local data repository with the first dataset from the first data source, further comprises: determining data at the first data source is available to subscribers of a data service provided by the first data source; and pushing the first dataset from the first data source based on determining that the first local data repository is one of the subscribers.

20. The method of any one of the preceding embodiments, further comprising: receiving a first request for a metadata-rich data transfer package for a first dataset from a first data source, wherein the first dataset is used to populate a first local data repository, wherein the first data source uses a first logical data model, and wherein the first local data repository has a first physical data model; in response to the first request, determining a first supplemental data structure for the first logical data model, wherein the first supplemental data structure is expressed in a standardized language and comprises a first attribute, and wherein the first attribute comprises a first transformer lineage of the first logical data model; determining a first dataset characteristic for the first dataset based on the first transformer lineage; and generating a first description for the metadata-rich data transfer package based on the first dataset characteristic.

21. The method of any one of the preceding embodiments, wherein the first transformer lineage maps a data flow of data from the first data source to the first local data repository, and wherein the first transformer lineage is based on the first logical data model and the first physical data model.

22. The method of any one of the preceding embodiments, wherein determining the first dataset characteristic for the first dataset based on the first transformer lineage further comprises: determining an input value used to create the first dataset; and determining an output value used to create the first dataset.

23. The method of any one of the preceding embodiments, wherein determining the first dataset characteristic for the first dataset based on the first transformer lineage further comprises: determining an accuracy of data related to the first attribute; and comparing the accuracy to a threshold accuracy.

24. The method of any one of the preceding embodiments, wherein determining the first dataset characteristic for the first dataset based on the first transformer lineage further comprises: determining a processing route used to create the first dataset; and validating the processing route.

25. The method of any one of the preceding embodiments, wherein determining the first supplemental data structure for the first logical data model further comprises: querying a metadata management domain for the first supplemental data structure; and retrieving the first supplemental data structure from a plurality of supplemental data structures stored at the metadata management domain, wherein each of the plurality of supplemental data structures corresponds to a respective logical data model.

26. The method of any one of the preceding embodiments, further comprising: retrieving a first attribute template from a plurality of attribute templates, wherein each attribute template of the plurality of attribute templates describes metadata using the standardized language; and generating the first attribute based on the first attribute template.

27. The method of any one of the preceding embodiments, further comprising: generating the first attribute based on the first attribute template; and assigning a data quality rule for the first attribute based on the first attribute template.

28. The method of any one of the preceding embodiments, further comprising: generating the first attribute based on the first attribute template; and assigning data access rights for the first attribute based on the first attribute template.

29. The method of any one of the preceding embodiments, further comprising: generating the first attribute based on the first attribute template; and assigning a data retention rule for the first attribute based on the first attribute template.

30. The method of any one of the preceding embodiments, wherein generating the first description for the metadata-rich data transfer package based on the first dataset characteristic further comprises: retrieving a threshold dataset characteristic; and comparing the first dataset characteristic to the threshold dataset characteristic to generate the first description.

31. The method of any one of the preceding embodiments, further comprising: determining a first data requirement for the first attribute; and determining a second data requirement for the first attribute based on the first data requirement.

32. The method of any one of the preceding embodiments, wherein the first supplemental data structure expresses in the standardized language a location of the first attribute in the first logical data model and a set of relationships between the first attribute and entities of the first logical data model, other attributes in the first logical data model, and a metadata management domain.

33. The method of any one of the preceding embodiments, wherein generating the first description for the metadata-rich data transfer package based on the first dataset characteristic further comprises: determining a producer data contract based on the first dataset characteristic, wherein the producer data contract comprises an application identifier and a location of a publication of a service-level agreement; and querying the location to validate the publication of the service-level agreement.

34. The method of any one of the preceding embodiments, further comprising: receiving a first request for a first data analytic operation to be performed using a plurality of logical data models, wherein each respective logical data model of the plurality of logical data models corresponds to a respective supplemental data structure that provides one or more transformer lineages of each respective logical data model in a standardized language; and performing the first data analytic operation by: determining a first data analytic operation characteristic corresponding to the first data analytic operation; retrieving a first supplemental data structure for a first logical data model of the plurality of logical data models; comparing the first data analytic operation characteristic to a first transformer lineage of the first supplemental data structure; and generating for display, on a user interface, a recommendation in response to the first request based on comparing the first data analytic operation characteristic to the first transformer lineage of the first supplemental data structure.

35. The method of any one of the preceding embodiments, wherein the one or more transformer lineages map data flows of data from a first data source to a first local data repository, and wherein the one or more transformer lineages are based on a respective logical data model and a respective physical data model.

36. The method of any one of the preceding embodiments, wherein the first supplemental data structure expresses in the standardized language a location of an attribute in the first logical data model and a set of relationships between the attribute and entities of the first logical data model, other attributes in the first logical data model, and a metadata management domain.

37. The method of any one of the preceding embodiments, wherein retrieving the first supplemental data structure for the first logical data model further comprises: querying a metadata management domain for the first supplemental data structure; and retrieving the first supplemental data structure from a plurality of supplemental data structures stored at the metadata management domain, wherein each of the plurality of supplemental data structures corresponds to a respective logical data model.

38. The method of any one of the preceding embodiments, wherein retrieving the first supplemental data structure for the first logical data model of the plurality of logical data models further comprises: determining that a first data source uses the first logical data model; and based on determining that the first data source uses the first logical data model, selecting the first logical data model from a plurality of logical data models, wherein the plurality of logical data models correspond to a first conceptual data model.

39. The method of any one of the preceding embodiments, wherein the first conceptual data model indicates a first relationship between a first entity and a second entity, and wherein the first relationship comprises a first attribute of the first logical data model that is mapped to a table of a first physical data model.

40. The method of any one of the preceding embodiments, wherein performing the first data analytic operation further comprises: determining a standardized template for performing the first data analytic operation; and generating code for performing the first data analytic operation based on the standardized template.

41. The method of any one of the preceding embodiments, wherein the standardized template is generated by: retrieving a standardized toolchain; and generating metadata for the standardized template in a standard format and standardized specification.

42. The method of any one of the preceding embodiments, wherein generating the code further comprises: retrieving a code repository, wherein the code repository comprises a plurality of artifacts; and selecting an artifact from the plurality of artifacts.

43. The method of any one of the preceding embodiments, wherein the artifact is an immutable file used to build, test, or deploy data.

44. The method of any one of the preceding embodiments, wherein generating for display the recommendation further comprises: generating a metadata-rich data transfer package for a first dataset from a first source based on the first supplemental data structure; determining a first dataset characteristic for the first dataset based on the first transformer lineage; and generating a first description for the metadata-rich data transfer package based on the first dataset characteristic.

45. The method of any one of the preceding embodiments, wherein comparing the first data analytic operation characteristic to the first transformer lineage of the first supplemental data structure further comprises: determining an accuracy of data related to the first transformer lineage; and comparing the accuracy to a threshold accuracy, wherein the recommendation comprises identifying that the accuracy exceeds the threshold accuracy.

46. The method of any one of the preceding embodiments, wherein the first data analytic operation comprises searching the plurality of logical data models for the first transformer lineage, wherein the first data analytic operation characteristic comprises the first transformer lineage, and wherein the recommendation comprises identifying the first logical data model as comprising the first transformer lineage.

47. A non-transitory, computer-readable medium storing instructions that, when executed by a data processing apparatus, cause the data processing apparatus to perform operations comprising those of any of embodiments 1-46.

48. A system comprising one or more processors; and memory storing instructions that, when executed by the processors, cause the processors to effectuate operations comprising those of any of embodiments 1-46.

49. A system comprising means for performing any of embodiments 1-46.

We claim:

1. A system for generating data transfers using programming language-agnostic data modeling platforms, the system comprising:
one or more processors; and
a non-transitory, computer-readable medium comprising instructions recorded thereon that, when executed by the one or more processors, cause operations comprising:
receiving a first request to populate a first local data repository with a first dataset from a first data source, wherein the first data source uses a first conceptual data model that indicates a first relationship between a first entity and a second entity, and wherein the first local data repository has a first physical data model;

determining that the first data source uses a first logical data model;

based on determining that the first data source uses the first logical data model, selecting the first logical data model from a plurality of logical data models, wherein the plurality of logical data models correspond to a first conceptual data model;

retrieving a first supplemental data structure for the first logical data model, wherein the first supplemental data structure comprises a first attribute expressed in a standardized language, and wherein the first attribute comprises a first transformer lineage of the first logical data model;

determining a first mapping of the first logical data model to the first physical data model by mapping the first attribute to the first physical data model, wherein the first mapping maps the first attribute to a table of the first physical data model;

populating the first local data repository with the first dataset based on the first mapping;

determining a first data requirement for the first attribute;

determining a first data type of the first attribute;

determining that a second attribute in a second logical data model comprises the first data type; and assigning a first data requirement to the second attribute based on determining that the second attribute in the second logical data model comprises the first data type.

2. A method for generating data transfers using programming language-agnostic data modeling platforms, the method comprising:

receiving a first request to populate a first local data repository with a first dataset from a first data source, wherein the first data source uses a first logical data model, and wherein the first local data repository has a first physical data model;

in response to the first request, retrieving a first supplemental data structure for the first logical data model, wherein the first supplemental data structure is expressed in a standardized language and comprises a first attribute, and wherein the first attribute comprises a first transformer lineage of the first logical data model;

determining a first mapping of the first logical data model to the first physical data model by mapping the first attribute to the first physical data model;

populating the first local data repository with the first dataset based on the first mapping;

determining a first data requirement for the first attribute;

determining a first data type of the first attribute;

determining that a second attribute in a second logical data model comprises the first data type; and assigning the first data requirement to the second attribute based on determining that the second attribute in the second logical data model comprises the first data type.

3. The method of claim 2, further comprising:

in response to the first request, determining that the first data source uses a first logical data model; and based on determining that the first data source uses the first logical data model, selecting the first logical data model from a plurality of logical data models, wherein the plurality of logical data models correspond to a first conceptual data model.

4. The method of claim 3, wherein the first conceptual data model indicates a first relationship between a first entity and a second entity, and wherein the first mapping maps the first attribute to a table of the first physical data model.

5. The method of claim 2, further comprising:

determining the first data requirement for a first entity in the first logical data model; and applying the first data requirement to the first attribute based on the first entity comprising the first data requirement.

6. The method of claim 5, wherein determining the first data requirement further comprises:

determining an accuracy of the first attribute; and comparing the accuracy to a threshold accuracy.

7. The method of claim 2, further comprising:

determining a first entity for the first attribute; and determining the first data requirement for the first attribute based on the first entity.

8. The method of claim 7, further comprising:

determining the first data requirement for the first attribute based on the first entity;

determining a first data type of the first attribute;

searching attributes of a second entity for data types corresponding to the first data type;

determining that a second attribute of the attributes of the second entity comprises the first data type; and assigning the first data requirement to the second attribute based on determining that the second attribute of the attributes of the second entity comprises the first data type.

9. The method of claim 2, wherein populating the first local data repository with the first dataset based on the first mapping further comprises:

retrieving the first data requirement for the first attribute from a metadata management domain; and processing data from the first dataset for the first attribute based on the first data requirement.

10. The method of claim 9, wherein processing the data from the first dataset for the first attribute based on the first data requirement further comprises:

determining a data owner for the first attribute; and determining, by the data owner, that the data is approved for populating the first local data repository.

11. The method of claim 2, wherein receiving the first request to populate the first local data repository with the first dataset from the first data source, further comprises:

receiving a subscription request from the first data source; and in response to the subscription request, subscribing to a data service provided by the first data source.

12. The method of claim 2, wherein the first supplemental data structure expresses in the standardized modeling language a location of the first attribute in the first logical data model and a set of relationships between the first attribute and entities of the first logical data model, other attributes in the first logical data model, and a metadata management domain.

13. The method of claim 2, wherein retrieving the first supplemental data structure for the first logical data model further comprises:

querying a metadata management domain for the first supplemental data structure; and retrieving the first supplemental data structure from a plurality of supplemental data structures stored at the metadata management domain, wherein each of the plurality of supplemental data structures corresponds to a respective logical data model.

14. The method of claim 2, wherein the first transformer lineage maps a data flow of data from the first data source to the first local data repository, and wherein the first transformer lineage is based on the first logical data model and the first physical data model.

15. A non-transitory, computer-readable medium comprising instructions recorded thereon that, when executed by one or more processors, cause operations comprising:
receiving a first request to populate a first local data repository with a first dataset from a first data source, wherein the first data source uses a first logical data model, and wherein the first local data repository has a first physical data model;
in response to the first request, retrieving a first supplemental data structure for the first logical data model, wherein the first supplemental data structure is expressed in a standardized language and comprises a first attribute, and wherein the first attribute comprises a first transformer lineage of the first logical data model;
determining a first mapping of the first logical data model to the first physical data model by mapping the first attribute to the first physical data model;
populating the first local data repository with the first dataset based on the first mapping;
determining a first data requirement for the first attribute;
determining a first data type of the first attribute;
determining that a second attribute in a second logical data model comprises the first data type; and
assigning a first data requirement to the second attribute based on determining that the second attribute in the second logical data model comprises the first data type.

16. The non-transitory, computer-readable medium of claim 15, wherein the instructions further cause operations comprising:
in response to the first request, determining that the first data source uses a first logical data model; and
based on determining that the first data source uses the first logical data model, selecting the first logical data model from a plurality of logical data models, wherein the plurality of logical data models correspond to a first conceptual data model.

17. The non-transitory, computer-readable medium of claim 16, wherein the first conceptual data model indicates a first relationship between a first entity and a second entity, and wherein the first mapping maps the first attribute to a table of the first physical data model.

18. The non-transitory, computer-readable medium of claim 15, further comprising:
determining the first data requirement for a first entity in the first logical data model; and
applying the first data requirement to the first attribute based on the first entity comprising the first data requirement.

19. The non-transitory, computer-readable medium of claim 18, wherein determining the first data requirement further comprises:
determining an accuracy of the first attribute; and
comparing the accuracy to a threshold accuracy.

* * * * *